United States Patent
Agiwal et al.

(10) Patent No.: US 12,520,365 B2
(45) Date of Patent: Jan. 6, 2026

(54) SYSTEM AND METHOD OF MULTI TRP BEAM FAILURE RECOVERY FOR SpCell AND MAC CE PRIORITIZATION

(71) Applicant: Samsung Electronics Co., Ltd., Suwon-si (KR)

(72) Inventors: Anil Agiwal, Suwon-si (KR); Seungri Jin, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 370 days.

(21) Appl. No.: 18/076,823

(22) Filed: Dec. 7, 2022

(65) Prior Publication Data
US 2023/0180334 A1 Jun. 8, 2023

(30) Foreign Application Priority Data
Dec. 7, 2021 (KR) .................. 10-2021-0173919

(51) Int. Cl.
| | | |
|---|---|---|
| *H04W 76/19* | (2018.01) | |
| *H04B 7/024* | (2017.01) | |
| *H04B 7/06* | (2006.01) | |
| *H04L 5/00* | (2006.01) | |
| *H04W 72/21* | (2023.01) | |
| *H04W 74/0833* | (2024.01) | |
| *H04W 74/0836* | (2024.01) | |
| *H04W 76/15* | (2018.01) | |
| *H04W 80/02* | (2009.01) | |

(52) U.S. Cl.
CPC ....... *H04W 76/19* (2018.02); *H04W 74/0841* (2013.01); *H04W 80/02* (2013.01)

(58) Field of Classification Search
CPC . H04W 76/19; H04W 74/0841; H04W 80/02; H04W 76/15; H04W 24/08; H04W 72/21; H04W 74/0836; H04B 7/06964; H04L 5/0048

See application file for complete search history.

(56) References Cited

U.S. PATENT DOCUMENTS

| | | | |
|---|---|---|---|
| 2020/0350972 A1 | 11/2020 | Yi et al. | |
| 2023/0413080 A1* | 12/2023 | Matsumura | H04W 76/10 |
| 2024/0224275 A1* | 7/2024 | Yu | H04L 5/0092 |
| 2024/0235763 A1* | 7/2024 | Yu | H04W 24/02 |
| 2024/0421886 A1* | 12/2024 | Turtinen | H04B 7/06964 |
| 2024/0430969 A1* | 12/2024 | Gao | H04B 7/06964 |

OTHER PUBLICATIONS

Samsung, 'MAC Running CR for Rel-17 feMIMO', R2-2111662, 3GPP TSG-RAN2 Meeting #116-e, Dec. 2, 2021.

(Continued)

*Primary Examiner* — Harry H Kim
(74) *Attorney, Agent, or Firm* — Jefferson IP Law, LLP

(57) ABSTRACT

The disclosure relates to a fifth generation (5G) or sixth generation (6G) communication system for supporting a higher data transmission rate. The disclosure relates to a wireless communication system. A system and a method of multi transmission and reception point (TRP) beam failure recovery for special cell (SpCell) and medium access control (MAC) control element (CE) prioritization are provided.

18 Claims, 8 Drawing Sheets

(56) References Cited

OTHER PUBLICATIONS

Qualcomm Incorporated, 'Discussion on multi-TRP BFR and new MIMO MAC CEs',R2-2110748, 3GPP TSG-RAN2 Meeting #116-e, Oct. 22, 2021.
Huawei et al., 'Beam failure recovery for multi-TRP', R2-2110877, 3GPP TSG-RAN2 Meeting #116-e, Oct. 21, 2021.
Intel Corporation, 'Remaining issues on mTRP BFR', R2-2109642, 3GPP TSG-RAN2 Meeting #116-e, Oct. 22, 2021.
International Search Report dated Feb. 27, 2023, issued in International Application No. PCT/KR2022/019812.
Samsung: "Multi TRP Beam Failure Detection and Recovery", 3GPP Draft; R2-2109529, 3rd Generation Partnership Project (3GPP), Mobile Competence Centre; 650, Route Des Lucioles; F-06921 Sophia-Antipolis Cedex; France, vol. RAN WG2, No. Electronic; Nov. 1, 2021-Nov. 12, 2021 Oct. 21, 2021 (Oct. 21, 2021).
European Search Report dated Feb. 14, 2025, issued in European Application No. 22904661.0.

* cited by examiner

FIG. 2

| $C_7$ | $C_6$ | $C_5$ | $C_4$ | $C_3$ | $C_2$ | $C_1$ | SP |
|---|---|---|---|---|---|---|---|
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| AC | R | Candidate RS ID or R bits ||||||

. . .

| AC | R | Candidate RS ID or R bits |

SYSTEM AND METHOD OF MULTI TRP BEAM FAILURE RECOVERY FOR SpCell AND MAC CE PRIORITIZATION

CROSS-REFERENCE TO RELATED APPLICATION(S)

This application is based on and claims priority under 35 U.S.C. § 119(a) of a Korean patent application number 10-2021-0173919, filed on Dec. 7, 2021, in the Korean Intellectual Property Office, the disclosure of which is incorporated by reference herein in its entirety.

BACKGROUND

1. Field

The disclosure relates to a wireless communication system. More particularly, the disclosure relates to a system and method of multi transmission and reception point (TRP) beam failure recovery for special cell (SpCell) and medium access control (MAC) control element (CE) prioritization.

2. Description of Related Art

Fifth generation (5G) mobile communication technologies define broad frequency bands such that high transmission rates and new services are possible, and can be implemented not only in "Sub 6 GHz" bands such as 3.5 GHz, but also in "Above 6 GHz" bands referred to as millimeter wave (mmWave) including 28 GHz and 39 GHz. In addition, it has been considered to implement sixth generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive multiple-input multiple-output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio (NR) Unlicensed (NR-U) aimed at system operations conforming to various regulation-related requirements in unlicensed bands, NR user equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for new radio (NR)). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a system and method of multi transmission and reception point (TRP) beam failure recovery for special cell (SpCell) and medium access control (MAC) control element (CE) prioritization.

Additional aspects will be set forth in part in the description which follows and, in part, will be apparent from the description, or may be learned by practice of the presented embodiments.

In accordance with an aspect of the disclosure, a method performed by a terminal in a wireless communication system is provided. The method includes detecting a beam failure for a first transmission and reception point (TRP) and a second TRP of a special cell (SpCell), and transmitting, to a base station on the SpCell, a message comprising beam failure recovery (BFR) medium access control (MAC) control element (CE), the BFR MAC CE comprises information on a beam failure detection for the first TRP and the second TRP of the SpCell, wherein in case that a size of an uplink resource for the message is available for the BFR MAC CE with beam failure recovery information of the first TRP and the second TRP of the SpCell, the message comprises the BFR MAC CE with the beam failure recovery information of the first TRP and the second TRP of the SpCell, and wherein in case that a size of an uplink resource for the message is not available for the BFR MAC CE with beam failure recovery information of the first TRP and the second TRP of the SpCell, the message comprises the BFR MAC CE with beam failure recovery information of the first TRP or the second TRP or the BFR MAC CE without the beam failure recovery information of the first TRP and the second TRP.

In an embodiment, in case that a size of an uplink resource for the message is available for the BFR MAC CE with beam failure recovery information of the first TRP and the second TRP of the SpCell and beam failure recovery information of a third TRP of a secondary cell (SCell), the message further comprises the beam failure recovery information of the third TRP of the SCell.

In an embodiment, in case that a size of an uplink resource for the message is available for the BFR MAC CE with beam failure recovery information of the first TRP and the second TRP of the SpCell, the message further comprises cell-radio network temporary identifier (C-RNTI) MAC CE.

In an embodiment, the message is a message A (MsgA) MAC protocol data unit (PDU) transmitted on a physical uplink shared channel (PUSCH), in case that a 2-step random access procedure is selected for a beam failure recovery.

In an embodiment, the transmitting the message comprises in case that a 4-step random access procedure is selected for a beam failure recovery, transmitting, to the base station, a random access preamble, receiving, from the base station, a random access response including uplink grant for the message transmission, and transmitting, to the base station, the message comprising the BFR MAC CE based on the uplink grant.

In an embodiment, the beam failure recovery information comprises at least one of information indicating whether a candidate beam is available or not, identity of a TRP, or a candidate reference signal (RS) identity (ID) in case that the candidate beam is available.

In accordance with another aspect of the disclosure, a method performed by a base station in a wireless communication system is provided. The method includes receiving, from a terminal on a special cell (SpCell), a message comprising beam failure recovery (BFR) medium access control (MAC) control element (CE), the BFR MAC CE comprises information on a beam failure detection for a first transmission and reception point (TRP) and a second TRP of the SpCell, and determining that the beam failure is detected for the first TRP and the second TRP of the SpCell, wherein in case that a size of an uplink resource for the message is available for the BFR MAC CE with beam failure recovery information of the first TRP and the second TRP of the SpCell, the message comprises the BFR MAC CE with the beam failure recovery information of the first TRP and the second TRP of the SpCell, and wherein in case that a size of an uplink resource for the message is not available for the BFR MAC CE with beam failure recovery information of the first TRP and the second TRP of the SpCell, the message comprises the BFR MAC CE with beam failure recovery information of the first TRP or the second TRP or the BFR MAC CE without the beam failure recovery information of the first TRP and the second TRP.

In an embodiment, in case that a size of an uplink resource for the message is available for the BFR MAC CE with beam failure recovery information of the first TRP and the second TRP of the SpCell and beam failure recovery information of a third TRP of a secondary cell (SCell), the message further comprises the beam failure recovery information of the third TRP of the SCell.

In an embodiment, in case that a size of an uplink resource for the message is available for the BFR MAC CE with beam failure recovery information of the first TRP and the second TRP of the SpCell, the message further comprises cell-radio network temporary identifier (C-RNTI) MAC CE.

In an embodiment, receiving the message comprises in case that a 4-step random access procedure is selected for a beam failure recovery, receiving, from the terminal, a random access preamble, transmitting, to the terminal, a random access response including uplink grant for the message transmission, and receiving, from the terminal, the message comprising the BFR MAC CE based on the uplink grant In an embodiment, in case that a 2-step random access procedure is selected for a beam failure recovery, the message is a message A (MsgA) MAC protocol data unit (PDU) transmitted on a physical uplink shared channel (PUSCH).

In an embodiment, the beam failure recovery information comprises at least one of information indicating whether a candidate beam is available or not, identity of a TRP, or a candidate reference signal (RS) identity (ID) in case that the candidate beam is available.

In accordance with another aspect of the disclosure, a terminal in a wireless communication system is provided. The terminal includes a transceiver, and a controller coupled with the transceiver and configured to detect a beam failure for a first TRP (transmission and reception point) and a second TRP of a special cell (SpCell), and transmit, to a base station on the SpCell, a message comprising beam failure recovery (BFR) medium access control (MAC) control element (CE), the BFR MAC CE comprises information on a beam failure detection for the first TRP and the second TRP of the SpCell, wherein in case that a size of an uplink resource for the message is available for the BFR MAC CE with beam failure recovery information of the first TRP and the second TRP of the SpCell, the message comprises the BFR MAC CE with the beam failure recovery information of the first TRP and the second TRP of the SpCell, and wherein in case that a size of an uplink resource for the message is not available for the BFR MAC CE with beam failure recovery information of the first TRP and the second TRP of the SpCell, the message comprises the BFR MAC CE with beam failure recovery information of the first TRP or the second TRP or the BFR MAC CE without the beam failure recovery information of the first TRP and the second TRP.

In accordance with another aspect of the disclosure, a base station in a wireless communication system is provided. The base station includes a transceiver, and a controller coupled with the transceiver and configured to receive, from a terminal on a special cell (SpCell), a message comprising beam failure recovery (BFR) medium access control (MAC) control element (CE), the BFR MAC CE comprises information on a beam failure detection for a first transmission and reception point (TRP) and a second TRP of the SpCell, and determine that the beam failure is detected for the first TRP and the second TRP of the SpCell, wherein in case that a size of an uplink resource for the message is available for the BFR MAC CE with beam failure recovery information of the first TRP and the second TRP of the SpCell, the message comprises the BFR MAC CE with the beam failure recovery information of the first TRP and the second TRP of the SpCell, and wherein in case that a size of an uplink resource for the message is not available for the BFR MAC CE with beam failure recovery information of the first TRP and the second TRP of the SpCell, the message comprises the BFR MAC CE with beam failure recovery information of the first TRP or the second TRP or the BFR MAC CE without the beam failure recovery information of the first TRP and the second TRP.

According to an embodiment of the disclosure, a system and method of multi TRP beam failure recovery for SpCell and MAC CE prioritization are proposed.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 is an example illustration of SCell BFR and Truncated SCell BFR MAC CE with the highest ServCellIndex of this MAC entity's SCell configured with BFD is equal to or higher than 8 according to an embodiment of the disclosure;

Throughout the drawings, it should be noted that like reference numbers are used to depict the same or similar elements, features, and structures.

DETAILED DESCRIPTION

Figure 1:
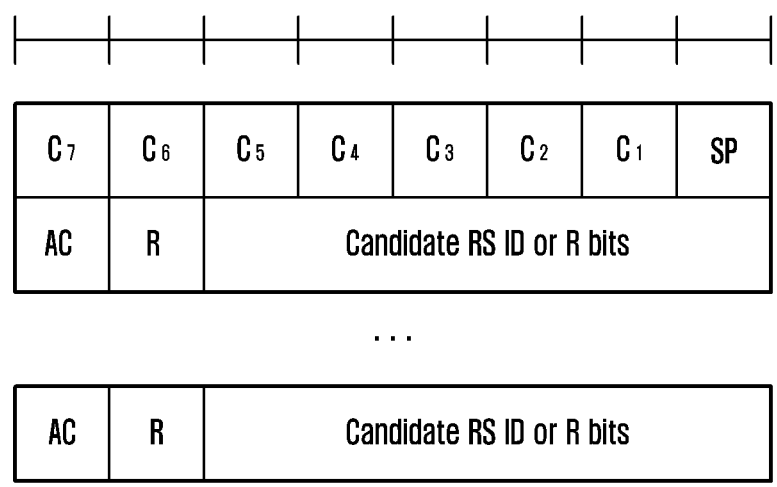
FIG. 1 is an example illustration of a secondary cell (SCell) beam failure recovery (BFR) and Truncated SCell BFR medium access control (MAC) control element (CE) with a highest ServCellIndex of this MAC entity's SCell configured with beam failure detection (BFD) is less than 8 according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may also refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

A "base station (BS)" is an entity communicating with a user equipment (UE) and may be referred to as a BS, a base transceiver station (BTS), a radio access network (RAN), a node B (NB), an evolved NB (eNB), an access point (AP), a fifth generation (5G) NB (5GNB), or a next generation NB (gNB).

A "user equipment (UE)" is an entity communicating with a BS and may be referred to as a UE, a device, a mobile station (MS), a mobile equipment (ME), or a terminal.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So fifth generation wireless communication system (also referred as next generation radio or NR) is being developed to meet the growing demand for high speed data services, support ultra-reliability and low latency applications.

The fifth generation wireless communication system supports not only lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the UEs having quite different capabilities depending on the use case and market segment the UE cater service to the end customer. Few example use cases the fifth generation wireless communication system wireless system is expected to address is enhanced Mobile Broadband (eMBB), massive Machine Type Communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the fifth generation wireless communication system operating in higher frequency (mmWave) bands, UE and gNB communicates with each other using Beamforming. Beamforming techniques are used to mitigate the propagation path losses and to increase the propagation distance for communication at higher frequency band. Beamforming enhances the transmission and reception performance using a high-gain antenna. Beamforming can be classified into Transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using beamforming technique, a transmitter can make plurality of transmit beam patterns of different directions. Each of these transmit beam patterns can be also referred as transmit (TX) beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming. A receiver can also make plurality of receive (RX) beam patterns of different directions. Each of these receive patterns can be also referred as receive (RX) beam.

The fifth generation wireless communication system, supports standalone mode of operation as well dual connectivity (DC). In DC a multiple Rx/Tx UE may be configured to utilize resources provided by two different nodes (or NBs) connected via non-ideal backhaul. One node acts as the Master Node (MN) and the other as the Secondary Node (SN). The MN and SN are connected via a network interface and at least the MN is connected to the core network. NR also supports Multi-RAT Dual Connectivity (MR-DC) operation whereby a UE in a radio resource control connected state (RRC_CONNECTED) is configured to utilize radio resources provided by two distinct schedulers, located in two different nodes connected via a non-ideal backhaul and providing either evolved-universal terrestrial radio access (E-UTRA) (i.e., if the node is an ng-eNB) or NR access (i.e., if the node is a gNB). In NR for a UE in RRC_CONNECTED not configured with carrier aggregation (CA)/DC there is only one serving cell comprising of the primary cell. For a UE in RRC_CONNECTED configured with CA/DC the term 'serving cells' is used to denote the set of cells comprising of the Special Cell(s) and all secondary cells. In NR the term Master Cell Group (MCG) refers to a group of serving cells associated with the Master Node, comprising of the primary cell (PCell) and optionally one or more secondary cells (Scells). In NR the term Secondary Cell Group (SCG) refers to a group of serving cells associated with the Secondary Node, comprising of the primary secondary cell (PSCell), primary SCG cell and optionally one or more Scells. In NR primary cell (Pcell) refers to a serving cell in MCG, operating on the primary frequency, in which the UE either performs the initial connection establishment procedure or initiates the connection re-establishment procedure. In NR for a UE configured with CA, Scell is a cell providing additional radio resources on top of Special Cell. Primary SCG Cell (PSCell) refers to a serving cell in SCG in which the UE performs random access when performing the Reconfiguration with Sync procedure. For Dual Connectivity operation the term SpCell (i.e., Special Cell) refers to the Pcell of the MCG or the PSCell of the SCG, otherwise the term Special Cell refers to the Pcell.

In the fifth generation wireless communication system, Physical Downlink Control Channel (PDCCH) is used to schedule DL transmissions on physical downlink shared channel (PDSCH) and UL transmissions on physical uplink shared channel (PUSCH), where the Downlink (DL) Control Information (DCI) on PDCCH includes: Downlink assignments containing at least modulation and coding format, resource allocation, and hybrid automatic repeat request (hybrid-ARQ) information related to downlink shared channel (DL-SCH); Uplink (UL) scheduling grants containing at least modulation and coding format, resource allocation, and hybrid-automatic repeat request (ARQ) information related to uplink shared channel (UL-SCH). In addition to scheduling, PDCCH can be used to for: Activation and deactivation of configured PUSCH transmission with configured grant; Activation and deactivation of PDSCH semi-persistent transmission; Notifying one or more UEs of the slot format; Notifying one or more UEs of the physical resource blocks (PRBs) and orthogonal frequency-division multiplexing (OFDM) symbol(s) where the UE may assume no transmission is intended for the UE; Transmission of transmission power control (TPC) commands for physical uplink control channel (PUCCH) and PUSCH; Transmission of one or more TPC commands for sounding reference signal (SRS) transmissions by one or more UEs; Switching a UE's active bandwidth part; Initiating a random access procedure. A UE monitors a set of PDCCH candidates in the configured monitoring occasions in one or more configured control resource sets (CORESETs) according to the corresponding search space configurations. A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own demodulation reference signal (DMRS). Quarterly phase shift keying (QPSK) modulation is used for PDCCH.

In fifth generation wireless communication system, a list of search space configurations are signaled by gNB for each configured bandwidth part (BWP) wherein each search configuration is uniquely identified by an identifier. Identifier of search space configuration to be used for specific purpose such as paging reception, SI reception, random access response reception is explicitly signaled by gNB. In NR search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion(s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the equation below:

$$(y*(\text{number of slots in a radio frame})+x-\text{Monitoring-offset-PDCCH-slot}) \mod (\text{Monitoring-periodicity-PDCCH-slot})=0;$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the CORESET associated with the search space. Search space configuration includes the identifier of CORESET configuration associated with it. A list of CORESET configurations are signaled by gNB for each configured BWP wherein each CORESET configuration is uniquely identified by an identifier. Note that each radio frame is of 10 ms duration. Radio frame is identified by a radio frame number or system frame number. Each radio frame comprises of several slots wherein the number of slots in a radio frame and duration of slots depends on sub carrier spacing. The number of slots in a radio frame and duration of slots depends radio frame for each supported subcarrier spacing (SCS) is pre-defined in NR. Each CORESET configuration is associated with a list of Transmission configuration indicator (TCI) states. One DL reference signal (RS) ID (synchronization signal block (SSB) or channel state information (CSI) RS) is configured per TCI state. The list of TCI states corresponding to a CORESET configuration is signaled by gNB via RRC signaling. One of the TCI state in TCI state list is activated and indicated to UE by gNB. TCI state indicates the DL TX beam (DL TX beam is quasi-co-located (QCLed) with SSB/CSI RS of TCI state) used by gNB for transmission of PDCCH in the PDCCH monitoring occasions of a search space.

In fifth generation wireless communication system bandwidth adaptation (BA) is supported. With BA, the receive and transmit bandwidth of a UE need not be as large as the bandwidth of the cell and can be adjusted: the width can be ordered to change (e.g., to shrink during period of low activity to save power); the location can move in the frequency domain (e.g., to increase scheduling flexibility);

and the subcarrier spacing can be ordered to change (e.g., to allow different services). A subset of the total cell bandwidth of a cell is referred to as a bandwidth part (BWP). BA is achieved by configuring RRC (radio resource control) connected UE with BWP(s) and telling the UE which of the configured BWPs is currently the active one. When BA is configured, the UE only has to monitor PDCCH on the one active BWP, i.e., it does not have to monitor PDCCH on the entire DL frequency of the serving cell. In RRC connected state, UE is configured with one or more DL and UL BWPs, for each configured Serving Cell (i.e., PCell or SCell). For an activated Serving Cell, there is always one active UL and DL BWP at any point in time. The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signaling, or by the MAC entity itself upon initiation of Random Access procedure. Upon addition of SpCell or activation of an SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL. Upon expiry of BWP inactivity timer UE switch to the active DL BWP to the default DL BWP or initial DL BWP (if default DL BWP is not configured).

In the 5G wireless communication system, random access (RA) is supported. Random access (RA) is used to achieve uplink (UL) time synchronization. RA is used during initial access, handover, radio resource control (RRC) connection re-establishment procedure, scheduling request transmission, secondary cell group (SCG) addition/modification, beam failure recovery and data or control information transmission in UL by non-synchronized UE in RRC CONNECTED state. Several types of random access procedure are supported.

Contention based random access (CBRA): This is also referred as 4 step CBRA. In this type of random access, UE first transmits Random Access preamble (also referred as Msg1) and then waits for Random access response (RAR) in the RAR window. RAR is also referred as Msg2. Next generation node B (gNB) transmits the RAR on physical downlink shared channel (PDSCH). PDCCH scheduling the PDSCH carrying RAR is addressed to RA-radio network temporary identifier (RA-RNTI). RA-RNTI identifies the time-frequency resource (also referred as physical RA channel (PRACH) occasion or PRACH transmission (TX) occasion or RA channel (RACH) occasion) in which RA preamble was detected by gNB. The RA-RNTI is calculated as follows: RA-RNTI=1+s_id+14*t_id+14*80*f_id+ 14*80*8*ul_carrier_id, where s_id is the index of the first orthogonal frequency division multiplexing (OFDM) symbol of the PRACH occasion where UE has transmitted Msg1, i.e., RA preamble; $0 \leq s\_id<14$; t_id is the index of the first slot of the PRACH occasion ($0 \leq t\_id<80$); f_id is the index of the PRACH occasion within the slot in the frequency domain ($0 \leq f\_id<8$), and ul_carrier_id is the UL carrier used for Msg1 transmission (0 for normal UL (NUL) carrier and 1 for supplementary UL (SUL) carrier. Several RARs for various Random access preambles detected by gNB can be multiplexed in the same RAR media access control (MAC) protocol data unit (PDU) by gNB. An RAR in MAC PDU corresponds to UE's RA preamble transmission if the RAR includes an RA preamble identifier (RAPID) of RA preamble transmitted by the UE. If the RAR corresponding to its RA preamble transmission is not received during the RAR window and UE has not yet transmitted the RA preamble for a configurable (configured by gNB in RACH configuration) number of times, the UE goes back to first step, i.e., select random access resource (preamble/ RACH occasion) and transmits the RA preamble. A backoff may be applied before going back to first step.

If the RAR corresponding to its RA preamble transmission is received the UE transmits message 3 (Msg3) in UL grant received in RAR. Msg3 includes message such as RRC connection request, RRC connection re-establishment request, RRC handover confirm, scheduling request, SI request etc. It may include the UE identity (i.e., cell-radio network temporary identifier (C-RNTI) or system architecture evolution (SAE)-temporary mobile subscriber identity (S-TMSI) or a random number). After transmitting the Msg3, UE starts a contention resolution timer. While the contention resolution timer is running, if UE receives a physical downlink control channel (PDCCH) addressed to C-RNTI included in Msg3, contention resolution is considered successful, contention resolution timer is stopped and RA procedure is completed. While the contention resolution timer is running, if UE receives contention resolution MAC control element (CE) including the UE's contention resolution identity (first X bits of common control channel (CCCH) service data unit (SDU) transmitted in Msg3), contention resolution is considered successful, contention resolution timer is stopped and RA procedure is completed. If the contention resolution timer expires and UE has not yet transmitted the RA preamble for a configurable number of times, UE goes back to first step, i.e., select random access resource (preamble/RACH occasion) and transmits the RA preamble. A backoff may be applied before going back to first step.

Contention free random access (CFRA): This is also referred as legacy CFRA or 4 step CFRA. CFRA procedure is used for scenarios such as handover where low latency is required, timing advance establishment for secondary cell (Scell), etc. Evolved node B (eNB) assigns to UE dedicated Random access preamble. UE transmits the dedicated RA preamble. ENB transmits the RAR on PDSCH addressed to RA-RNTI. RAR conveys RA preamble identifier and timing alignment information. RAR may also include UL grant. RAR is transmitted in RAR window similar to contention based RA (CBRA) procedure. CFRA is considered successfully completed after receiving the RAR including RA preamble (RAP) identifier (RAPID) of RA preamble transmitted by the UE. In case RA is initiated for beam failure recovery, CFRA is considered successfully completed if PDCCH addressed to C-RNTI is received in search space for beam failure recovery. If the RAR window expires and RA is not successfully completed and UE has not yet transmitted the RA preamble for a configurable (configured by gNB in RACH configuration) number of times, the UE retransmits the RA preamble.

For certain events such has handover and beam failure recovery if dedicated preamble(s) are assigned to UE, during first step of random access, i.e., during random access resource selection for Msg1 transmission UE determines whether to transmit dedicated preamble or non dedicated preamble. Dedicated preambles are typically provided for a subset of synchronization signal blocks/channel state information reference signals (SSBs/CSI RSs). If there is no SSB/CSI RS having DL (downlink) RSRP (reference-signal received power) above a threshold amongst the SSBs/CSI RSs for which contention free random access resources (i.e., dedicated preambles/Ros) are provided by gNB, UE selects non dedicated preamble. Otherwise UE selects dedicated preamble. So during the RA procedure, one random access attempt can be CFRA while other random access attempt can be CBRA.

2 step contention based random access (2 step CBRA): In the first step, UE transmits random access preamble on PRACH and a payload (i.e., MAC PDU) on PUSCH. The random access preamble and payload transmission is also referred as MsgA. In the second step, after MsgA transmission, the UE monitors for a response from the network (i.e., gNB) within a configured window. The response is also referred as MsgB. If common control channel (CCCH) service data unit (SDU) was transmitted in a MsgA payload, UE performs contention resolution using the contention resolution information in MsgB. The contention resolution is successful if the contention resolution identity received in MsgB matches first 48 bits of CCCH SDU transmitted in MsgA. If C-RNTI was transmitted in MsgA payload, the contention resolution is successful if UE receives PDCCH addressed to C-RNTI. If contention resolution is successful, random access procedure is considered successfully completed. Instead of contention resolution information corresponding to the transmitted MsgA, MsgB may include a fallback information corresponding to the random access preamble transmitted in MsgA. If the fallback information is received, UE transmits Msg3 and performs contention resolution using Msg4 as in CBRA procedure. If contention resolution is successful, random access procedure is considered successfully completed. If contention resolution fails upon fallback (i.e., upon transmitting Msg3), UE retransmits MsgA. If configured window in which UE monitor network response after transmitting MsgA expires and UE has not received MsgB including contention resolution information or fallback information as explained above, UE retransmits MsgA. If the random access procedure is not successfully completed even after transmitting the msgA configurable number of times, UE fallbacks to 4 step RACH procedure, i.e., UE only transmits the PRACH preamble.

MsgA payload may include one or more of common control channel (CCCH) service data unit (SDU), dedicated control channel (DCCH) SDU, dedicated traffic channel (DTCH) SDU, buffer status report (BSR) MAC control element (CE), power headroom report (PHR) MAC CE, SSB information, C-RNTI MAC CE, or padding. MsgA may include UE ID (e.g., random ID, S-TMSI, C-RNTI, resume ID, etc.) along with preamble in first step. The UE ID may be included in the MAC PDU of the MsgA. UE ID such as C-RNTI may be carried in MAC CE wherein MAC CE is included in MAC PDU. Other UE IDs (such random ID, S-TMSI, C-RNTI, resume ID, etc.) may be carried in CCCH SDU. The UE ID can be one of random ID, S-TMSI, C-RNTI, resume ID, international mobile subscriber identity (IMSI), idle mode ID, inactive mode ID, etc. The UE ID can be different in different scenarios in which UE performs the RA procedure. When UE performs RA after power on (before it is attached to the network), then UE ID is the random ID. When UE perform RA in IDLE state after it is attached to network, the UE ID is S-TMSI. If UE has an assigned C-RNTI (e.g., in connected state), the UE ID is C-RNTI. In case UE is in INACTIVE state, UE ID is resume ID. In addition to UE ID, some addition ctrl information can be sent in MsgA. The control information may be included in the MAC PDU of the MsgA. The control information may include one or more of connection request indication, connection resume request indication, SI request indication, buffer status indication, beam information (e.g., one or more DL TX beam ID(s) or SSB ID(s)), beam failure recovery indication/information, data indicator, cell/BS/TRP switching indication, connection re-establishment indication, reconfiguration complete or handover complete message, etc.

2 step contention free random access (2 step CFRA): In this case gNB assigns to UE dedicated Random access preamble (s) and PUSCH resource(s) for MsgA transmission. RO(s) to be used for preamble transmission may also be indicated. In the first step, UE transmits random access preamble on PRACH and a payload on PUSCH using the contention free random access resources (i.e., dedicated preamble/PUSCH resource/RO). In the second step, after MsgA transmission, the UE monitors for a response from the network (i.e., gNB) within a configured window. If UE receives PDCCH addressed to C-RNTI, random access procedure is considered successfully completed. If UE receives fallback information corresponding to its transmitted preamble, random access procedure is considered successfully completed.

For certain events such has handover and beam failure recovery if dedicated preamble(s) and PUSCH resource(s) are assigned to UE, during first step of random access, i.e., during random access resource selection for MsgA transmission UE determines whether to transmit dedicated preamble or non dedicated preamble. Dedicated preambles are typically provided for a subset of SSBs/CSI RSs. If there is no SSB/CSI RS having DL RSRP above a threshold amongst the SSBs/CSI RSs for which contention free random access resources (i.e., dedicated preambles/RACH occasions (ROs)/PUSCH resources) are provided by gNB, UE selects non dedicated preamble. Otherwise UE selects dedicated preamble. So during the RA procedure, one random access attempt can be 2 step CFRA while other random access attempt can be 2 step CBRA.

Upon initiation of random access procedure, UE first selects the carrier (SUL or NUL). If the carrier to use for the Random Access procedure is explicitly signaled by gNB, UE selects the signaled carrier for performing Random Access procedure. If the carrier to use for the Random Access procedure is not explicitly signaled by gNB; and if the Serving Cell for the Random Access procedure is configured with supplementary uplink and if the RSRP of the downlink pathloss reference is less than rsrp-Threshold-SSB-SUL: UE selects the SUL carrier for performing Random Access procedure. Otherwise, UE selects the NUL carrier for performing Random Access procedure. Upon selecting the UL carrier, UE determines the UL and DL BWP for random access procedure as specified in section 5.15 of TS 38.321. UE then determines whether to perform 2 step or 4 step RACH for this random access procedure.

If this random access procedure is initiated by PDCCH order and if the ra-PreambleIndex explicitly provided by PDCCH is not 0b000000, UE selects 4 step RACH.

else if 2 step contention free random access resources are signaled by gNB for this random access procedure, UE selects 2 step RACH.

else if 4 step contention free random access resources are signaled by gNB for this random access procedure, UE selects 4 step RACH.

else if the UL BWP selected for this random access procedure is configured with only 2 step RACH resources, UE selects 2 step RACH.

else if the UL BWP selected for this random access procedure is configured with only 4 step RACH resources, UE selects 4 step RACH.

else if the UL BWP selected for this random access procedure is configured with both 2 step and 4 step RACH resources,
if RSRP of the downlink pathloss reference is below a configured threshold, UE selects 4 step RACH. Otherwise UE selects 2 step RACH.

In the fifth generation wireless communication system, node B (gNB) or base station in cell broadcast Synchronization Signal and PBCH block (SSB) consists of primary synchronization signals (PSSs) and secondary synchronization signals (SSSs) and system information (SI). System information includes common parameters needed to communicate in cell. In the fifth generation wireless communication system (also referred as next generation radio or NR), System Information (SI) is divided into the master information block (MIB) and a number of system information blocks (SIBs) where:

the MIB is always transmitted on the broadcast channel (BCH) with a periodicity of 80 ms and repetitions made within 80 ms and it includes parameters that are needed to acquire SIB1 from the cell.

the SIB1 is transmitted on the DL-SCH with a periodicity of 160 ms and variable transmission repetition. The default transmission repetition periodicity of SIB1 is 20 ms but the actual transmission repetition periodicity is up to network implementation. The scheduling information in SIB1 includes mapping between SIBs and SI messages, periodicity of each SI message and SI window length. The scheduling information in SIB 1 includes an indicator for each SI message, which indicates whether the concerned SI message is being broadcasted or not. If at least one SI message is not being broadcasted, SIB1 may include random access resources (PRACH preamble(s) and PRACH resource(s)) for requesting gNB to broadcast one or more SI message(s).

SIBs other than SIB1 are carried in SystemInformation (SI) messages, which are transmitted on the DL-SCH. Only SIBs having the same periodicity can be mapped to the same SI message. Each SI message is transmitted within periodically occurring time domain windows (referred to as SI-windows with same length for all SI messages). Each SI message is associated with a SI-window and the SI-windows of different SI messages do not overlap. That is, within one SI-window only the corresponding SI message is transmitted. Any SIB except SIB1 can be configured to be cell specific or area specific, using an indication in SIB1. The cell specific SIB is applicable only within a cell that provides the SIB while the area specific SIB is applicable within an area referred to as SI area, which consists of one or several cells and is identified by systemInformation-AreaID.

UE acquires SIB 1 from the camped or serving cell. UE check the BroadcastStatus bit in SIB 1 for SI message which UE needs to acquire. SI request configuration for SUL is signaled by gNB using the IE si-RequestConfigSUL in SIB1. If the IE si-RequestConfigSUL is not present in SIB1, UE considers that SI request configuration for SUL is not signaled by gNB. SI request configuration for NUL is signaled by gNB using the IE si-RequestConfig in SIB1. If the IE si-RequestConfig is not present in SIB1, UE considers that SI request configuration for NUL is not signaled by gNB. If SI message which UE needs to acquire is not being broadcasted (i.e., BroadcastStatus bit is set to zero), UE initiates transmission of SI request. The procedure for SI request transmission is as follows:

If SI request configuration is signaled by gNB for SUL, and criteria to select SUL is met (i.e., RSRP derived from SSB measurements of camped or serving cell<rsrp-ThresholdSSB-SUL, where rsrp-ThresholdSSB-SUL is signaled by gNB (e.g., in broadcast signaling such as SIB1)): UE initiate transmission of SI request based on Msg1 based SI request on SUL. In other words, UE initiates Random Access procedure using the PRACH preamble(s) and PRACH resource(s) in SI request configuration of SUL. UE transmits Msg1 (i.e., Random access preamble) and waits for acknowledgement for SI request. Random access resources (PRACH preamble(s) and PRACH occasions(s)) indicated in SI request configuration of SUL is used for Msg1. Msg1 is transmitted on SUL. If acknowledgement for SI request is received, UE monitors the SI window of the requested SI message in one or more SI period(s) of that SI message.

Else if SI request configuration is signaled by gNB for NUL and criteria to select NUL is met (i.e., NUL is selected if SUL is supported in camped or serving cell and RSRP derived from SSB measurements of camped or serving cell>=rsrp-ThresholdSSB-SUL; OR NUL is selected if SUL is not supported in serving cell): UE initiate transmission of SI request based on Msg1 based SI request on NUL. In other words, UE initiates Random Access procedure using the PRACH preamble(s) and PRACH resource(s) in SI request configuration of NUL. UE transmits Msg1 (i.e., Random access preamble) and waits for acknowledgement for SI request. Random access resources (PRACH preamble(s) and PRACH occasions(s)) indicated in SI request configuration of NUL is used for Msg1. Msg1 is transmitted on NUL. If acknowledgement for SI request is received, UE monitors the SI window of the requested SI message in one or more SI period(s) of that SI message.

Else UE initiate transmission of SI request based on Msg3 based SI request. In other words, UE initiate transmission of RRCSystemInfoRequest message. UE transmits Msg1 (i.e., Random access preamble) and waits for random access response. Common random access resources (PRACH preamble(s) and PRACH occasions(s)) are used for Msg1. In the UL grant received in random access response, UE transmits RRCSystemInfoRequest message and waits for acknowledgement for SI request (i.e., RRCSystemInfoRequest message). If acknowledgement for SI request (i.e., RRCSystemInfoRequest message) is received, UE monitors the SI window of the requested SI message in one or more SI period(s) of that SI message. Note that if SUL is configured, UL carrier for Msg1 transmission will be selected by UE in similar manner as selected by UE for Msg1 based SI request. SUL is the selected UL carrier, if RSRP derived from SSB measurements of camped or serving cell<rsrp-ThresholdSSB-SUL where rsrp-ThresholdSSB-SUL is signaled by gNB (e.g., in broadcast signaling such as SIB1). NUL is the selected UL carrier, if RSRP derived from SSB measurements of camped or serving cell>=rsrp-ThresholdSSB-SUL where rsrp-ThresholdSSB-SUL is signaled by gNB (e.g., in broadcast signaling such as SIB1).

In the fifth generation wireless communication system, RRC can be in one of the following states: RRC_IDLE, RRC_INACTIVE, and RRC_CONNECTED. A UE is either in RRC_CONNECTED state or in RRC_INACTIVE state when an RRC connection has been established. If this is not the case, i.e., no RRC connection is established, the UE is in RRC_IDLE state. The RRC states can further be characterized as follows:

In the RRC_IDLE, a UE specific discontinuous reception (DRX) may be configured by upper layers. The UE monitors Short Messages transmitted with paging RNTI (P-RNTI)

over DCI; monitors a Paging channel for CN paging using 5G-S-TMSI; performs neighboring cell measurements and cell (re-)selection; acquires system information and can send SI request (if configured); performs logging of available measurements together with location and time for logged measurement configured UEs.

In RRC_INACTIVE, a UE specific DRX may be configured by upper layers or by RRC layer; UE stores the UE Inactive access stratum (AS) context; a RAN-based notification area is configured by RRC layer. The UE monitors Short Messages transmitted with P-RNTI over DCI; monitors a Paging channel for CN paging using 5G-S-TMSI and RAN paging using full I-RNTI; performs neighboring cell measurements and cell (re-)selection; performs RAN-based notification area updates periodically and when moving outside the configured RAN-based notification area; acquires system information and can send SI request (if configured); performs logging of available measurements together with location and time for logged measurement configured UEs.

In the RRC_CONNECTED, the UE stores the AS context and transfer of unicast data to/from UE takes place. The UE monitors Short Messages transmitted with P-RNTI over DCI, if configured; monitors control channels associated with the shared data channel to determine if data is scheduled for it; provides channel quality and feedback information; performs neighboring cell measurements and measurement reporting; acquires system information.

In the RRC_CONNECTED, network may initiate suspension of the RRC connection by sending RRCRelease with suspend configuration. When the RRC connection is suspended, the UE stores the UE Inactive AS context and any configuration received from the network, and transits to RRC_INACTIVE state. If the UE is configured with SCG, the UE releases the SCG configuration upon initiating an RRC Connection Resume procedure. The RRC message to suspend the RRC connection is integrity protected and ciphered.

The resumption of a suspended RRC connection is initiated by upper layers when the UE needs to transit from RRC_INACTIVE state to RRC_CONNECTED state or by RRC layer to perform an RNA update or by RAN paging from NG-RAN. When the RRC connection is resumed, network configures the UE according to the RRC connection resume procedure based on the stored UE Inactive AS context and any RRC configuration received from the network. The RRC connection resume procedure re-activates AS security and re-establishes SRB(s) and DRB(s). In response to a request to resume the RRC connection, the network may resume the suspended RRC connection and send UE to RRC_CONNECTED, or reject the request to resume and send UE to RRC_INACTIVE (with a wait timer), or directly re-suspend the RRC connection and send UE to RRC_INACTIVE, or directly release the RRC connection and send UE to RRC_IDLE, or instruct the UE to initiate NAS (non-access stratum) level recovery (in this case the network sends an RRC setup message).

Upon initiating the resume procedure, UE:

Apply the default L1 parameter values as specified in corresponding physical layer specifications, except for the parameters for which values are provided in SIB1; apply the default MAC Cell Group configuration; apply the CCCH configuration; start timer T319; apply the timeAlignment-TimerCommon included in SIB1; apply the default SRB1 configuration; set the variable pendingRNA-Update to false; initiate transmission of the RRCResumeRequest message or RRCResumeRequest1; restore the RRC configuration, RoHC state, the stored QoS flow to DRB mapping rules and the KgNB and KRRCint keys from the stored UE Inactive AS context except for the following: masterCellGroup, mrdc-SecondaryCellGroup, if stored; and pdcp-Config; set the resumeMAC-I to the 16 least significant bits of the MAC-I calculated: with the KRRCint key in the UE Inactive AS Context and the previously configured integrity protection algorithm; and with all input bits for COUNT, BEARER and DIRECTION set to binary ones; derive the KgNB key based on the current KgNB key or the NH, using the stored nextHopChainingCount value; derive the KRRCenc key, the KRRCint key, the KUPint key and the KUPenc key; configure lower layers to apply integrity protection for all signaling radio bearers except SRB0 using the configured algorithm and the KRRCint key and KUPint key, i.e., integrity protection shall be applied to all subsequent messages received and sent by the UE; configure lower layers to apply ciphering for all signaling radio bearers except SRB0 and to apply the configured ciphering algorithm, the KRRCenc key and the KUPenc key derived in this subclause, i.e., the ciphering configuration shall be applied to all subsequent messages received and sent by the UE; re-establish PDCP entities for SRB1; resume SRB1; transmit RRCResumeRequest or RRCResumeRequest1.

The fifth generation wireless communication system supports beam failure detection and recovery mechanism at UE for serving cell. This comprises of beam failure detection, new candidate beam identification, beam failure recovery (BFR) request transmission and monitoring response for beam failure recovery request. For beam failure detection of a serving cell, UE is configured with a list of beam failure detection (BFD) RSs (SSB or CSI-RS based) for that serving cell. UE monitors these RSs periodically. A beam failure is detected on a serving cell if number of consecutive detected beam failure instance exceeds a configured maximum number (beamFailureInstanceMaxCount) within a configured time (beamFailureDetectionTimer). A Beam Failure Instance means that hypothetical PDCCH block error rate (BLER) determined based on measurement of beam failure detection RS is above a threshold for all beam failure detection RSs. Beam failure detection may be configured for zero or one or more serving cells. Upon beam failure instance, lower layer, i.e., physical layer (PHY) sends indication to MAC. The MAC entity in UE for each Serving Cell configured for beam failure detection, perform the following operation:

1> if beam failure instance indication has been received from lower layers:
2> start or restart the beamFailureDetectionTimer;
2> increment BFI_COUNTER by 1;
2> if BFI_COUNTER>=beamFailureInstanceMaxCount:
3> if the Serving Cell is SCell:
4> trigger a BFR for this Serving Cell;
3> else:
4> initiate a Random Access procedure on the SpCell.
1> if the beamFailureDetectionTimer expires; or
1> if beamFailureDetectionTimer, beamFailureInstanceMaxCount, or any of the reference signals used for beam failure detection is reconfigured by upper layers (i.e., RRC) associated with this Serving Cell:
2> set BFI_COUNTER to 0.
1> if the Serving Cell is SpCell and the Random Access procedure initiated for SpCell beam failure recovery is successfully completed:
2> set BFI_COUNTER to 0;
2> stop the beamFailureRecoveryTimer, if configured;

2> consider the Beam Failure Recovery procedure successfully completed.
1> else if the Serving Cell is SCell, and a PDCCH addressed to C-RNTI indicating uplink grant for a new transmission is received for the hybrid automatic repeat request (HARQ) process used for the transmission of the BFR MAC CE or Truncated BFR MAC CE which contains beam failure recovery information of this Serving Cell; or
1> if the SCell is deactivated:
2> set BFI_COUNTER to 0;
2> consider the Beam Failure Recovery procedure successfully completed and cancel all the triggered BFRs for this Serving Cell.

The MAC entity shall:
1> if the Beam Failure Recovery procedure determines that at least one BFR has been triggered and not cancelled:
2> if UL-SCH resources are available for a new transmission and if the UL-SCH resources can accommodate the BFR MAC CE plus its subheader as a result of logical channel prioritization (LCP):
3> instruct the Multiplexing and Assembly procedure to generate the BFR MAC CE.
2> else if UL-SCH resources are available for a new transmission and if the UL-SCH resources can accommodate the Truncated BFR MAC CE plus its subheader as a result of LCP:
3> instruct the Multiplexing and Assembly procedure to generate the Truncated BFR MAC CE.
2> else:
3> trigger the SR for SCell beam failure recovery for each SCell for which BFR has been triggered and not cancelled.

All BFRs triggered prior to MAC PDU assembly for beam failure recovery for an SCell shall be cancelled when a MAC PDU is transmitted and this PDU includes a BFR MAC CE or Truncated BFR MAC CE which contains beam failure information of that SCell.

beamFailureInstanceMaxCount, beamFailureDetectionTimer, beamFailureRecoveryTimer for the beam failure recovery procedure are specific to serving cell. BFI_COUNTER is maintained separately for each serving cell configured with beam failure detection.

The MAC CEs for BFR consists of either:
BFR MAC CE; or
Truncated BFR MAC CE.

The BFR MAC CE and Truncated BFR MAC CE are identified by a MAC subheader with LCID/eLCID.

FIG. 1 is an example illustration of SCell BFR and Truncated SCell BFR MAC CE with the highest ServCellIndex of this MAC entity's SCell configured with BFD is less than 8 according to an embodiment of the disclosure.

FIG. 2 is an example illustration of SCell BFR and Truncated SCell BFR MAC CE with the highest ServCellIndex of this MAC entity's SCell configured with BFD is equal to or higher than 8 according to an embodiment of the disclosure.

The BFR MAC CE and Truncated BFR MAC CE have a variable size. They include a bitmap and in ascending order based on the ServCellIndex, beam failure recovery information, i.e., octets containing candidate beam availability indication (AC) for SCells indicated in the bitmap. For BFR MAC CE, a single octet bitmap is used when the highest ServCellIndex of this MAC entity's SCell for which beam failure is detected is less than 8, otherwise four octets are used. A MAC PDU shall contain at most one BFR MAC CE.

For Truncated BFR MAC CE, a single octet bitmap is used for the following cases, otherwise four octets are used:
the highest ServCellIndex of this MAC entity's SCell for which beam failure is detected is less than 8; or
beam failure is detected for SpCell and the SpCell is to be indicated in a Truncated BFR MAC CE and the UL-SCH resources available for transmission cannot accommodate the Truncated BFR MAC CE with the four octets bitmap plus its subheader as a result of LCP.

The fields in the BFR MAC CEs are defined as follows:
SP: This field indicates beam failure detection for the SpCell of this MAC entity. The SP field is set to 1 to indicate that beam failure is detected for SpCell only when BFR MAC CE or Truncated BFR MAC CE is to be included into a MAC PDU as part of Random Access Procedure, otherwise, it is set to 0;

Ci (BFR MAC CE): This field indicates beam failure detection and the presence of an octet containing the AC field for the SCell with ServCellIndex i. The Ci field set to 1 indicates that beam failure is detected and the octet containing the AC field is present for the SCell with ServCellIndex i. The Ci field set to 0 indicates that the beam failure is not detected and octet containing the AC field is not present for the SCell with ServCellIndex i. The octets containing the AC field are present in ascending order based on the ServCellIndex;

Ci (Truncated BFR MAC CE): This field indicates beam failure detection for the SCell with ServCellIndex i. The Ci field set to 1 indicates that beam failure is detected and the octet containing the AC field for the SCell with ServCellIndex i may be present. The Ci field set to 0 indicates that the beam failure is not detected and the octet containing the AC field is not present for the SCell with ServCellIndex i. The octets containing the AC field, if present, are included in ascending order based on the ServCellIndex. The number of octets containing the AC field included is maximized, while not exceeding the available grant size;

AC: This field indicates the presence of the Candidate RS ID field in this octet. If at least one of the SSBs with SS-RSRP above rsrp-ThresholdBFR amongst the SSBs in candidateBeamRSSCellList or the CSI-RSs with CSI-RSRP above rsrp-ThresholdBFR amongst the CSI-RSs in candidateBeamRSSCellList is available, the AC field is set to 1; otherwise, it is set to 0. If the AC field set to 1, the Candidate RS ID field is present. If the AC field set to 0, R bits are present instead;

Candidate RS ID: This field is set to the index of an SSB with SS-RSRP above rsrp-ThresholdBFR amongst the SSBs in candidateBeamRSSCellList or to the index of a CSI-RS with CSI-RSRP above rsrp-ThresholdBFR amongst the CSI-RSs in candidateBeamRSSCellList. The length of this field is 6 bits.

R: Reserved bit, set to 0.

Figure 3:
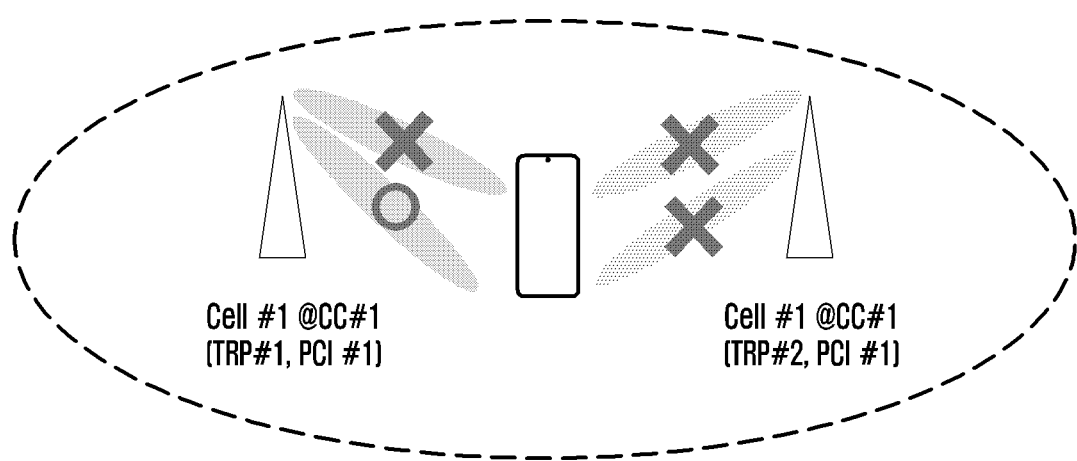
FIG. 3 is an example illustration of beam failure detection and recovery in multiple transmission and reception points (TRPs) according to an embodiment of the disclosure.

FIG. 3 is an example illustration of beam failure detection and recovery in multiple TRPs according to an embodiment of the disclosure.

Referring to FIG. 3, a serving cell can support multiple transmission/reception points (TRPs) and UE can be served with multiple TRPs concurrently for improved data rate and reliability. In the current design, beam failure detection and recovery is per serving cell; List of BFD RSs is signaled per serving cell and Candidate beam RS list is signaled per serving cell. As shown in FIG. 3, if all beams of a TRP fails, beam failure is not detected and hence one or more TRP(s) cannot serve the UE until all TRPs fail and recovery is initiated. BFD/BFR procedure is being enhanced to support multi TRP BFD/BFR. There can be up to two TRPs in a serving cell. BFD/BFR is performed per TRP. Separate BFD-RS set and candidate beam list for each TRP is signaled by gNB. BFI_COUNTER is maintained separately for each TRP of serving cell.

A beam failure is detected for a TRP of a serving cell if number of consecutive detected beam failure instance for the TRP exceeds a configured maximum number (beamFailureInstanceMaxCount) within a configured time (beamFailureDetectionTimer). beamFailureDetectionTimer and beamFailureInstanceMaxCount is configured/signaled by gNB separately for each TRP of serving cell. A Beam Failure Instance for a TRP means that hypothetical PDCCH BLER determined based on measurement of beam failure detection RS is above a threshold for all beam failure detection RSs in BFD-RS set of the TRP. Upon beam failure instance for a TRP, lower layer, i.e., PHY sends indication to MAC. MAC entity in UE performs the following operation for serving cell configured with multiple BFD-RS sets:

1> if the Serving Cell is configured with multiple BFD-RS sets, the MAC entity shall for each BFD-RS set of this Serving Cell:
    2> if beam failure instance indication for a BFD-RS set has been received from lower layers:
    3> start or restart the beamFailureDetectionTimer corresponding to the BFD-RS set;
    3> increment BFI_COUNTER corresponding to the BFD-RS set by 1;
    3> if BFI_COUNTER>=beamFailureInstanceMaxCount:
    4> trigger a BFR for this BFD-RS set of the Serving Cell;
    2> if BFR for both BFD-RS sets of the Serving Cell are triggered and pending (i.e., not cancelled or not successfully completed):
    3> if the Serving Cell is SpCell:
    4> initiate a Random Access procedure on the SpCell;
    4> if the initiated Random Access procedure is successfully completed:
    5> set BFI_COUNTER of each BFD-RS set of SpCell to 0.
    2> if the beamFailureDetectionTimer of this BFD-RS set expires; or
    2> if beamFailureDetectionTimer, beamFailureInstanceMaxCount, or any of the reference signals used for beam failure detection is reconfigured by upper layers associated with this BFD-RS set of the Serving Cell:
    3> set BFI_COUNTER corresponding to the BFD-RS set to 0.
    2> if a PDCCH addressed to C-RNTI indicating uplink grant for a new transmission is received for the HARQ process used for the transmission of the Enhanced BFR MAC CE or Truncated Enhanced BFR MAC CE which contains beam failure recovery information of this BFD-RS set of the Serving Cell; or
    2> if the SCell is deactivated as specified in clause 5.9:
    3> set BFI_COUNTER corresponding to the BFD-RS set to 0;
    1> if the Beam Failure Recovery procedure determines that at least one BFR for BFD-RS set has been triggered and not cancelled for an Scell for which evaluation of the candidate beams according to the requirements as specified in TS 38.133 [11] has been completed; or
    1> if the Beam Failure Recovery procedure determines that at least one BFR for BFD-RS set for only one BFD-RS set has been triggered and not cancelled for an SpCell for which evaluation of the candidate beams according to the requirements as specified in TS 38.133 [11] has been completed:
    2> if UL-SCH resources are available for a new transmission and if the UL-SCH resources can accommodate the Enhanced BFR MAC CE plus its sub header as a result of LCP:
    3> instruct the Multiplexing and Assembly procedure to generate the Enhanced BFR MAC CE.
    2> else if UL-SCH resources are available for a new transmission and if the UL-SCH resources can accommodate the Truncated Enhanced BFR MAC CE plus its sub header as a result of LCP:
    3> instruct the Multiplexing and Assembly procedure to generate the Truncated Enhanced BFR MAC CE.
    2> else:
    3> trigger the SR for beam failure recovery of each BFD-RS set for which BFR has been triggered, not cancelled, and for which evaluation of the candidate beams according to the requirements as specified in TS 38.133 [11] has been completed.

All BFRs triggered for an Scell shall be cancelled when a MAC PDU is transmitted and this PDU includes a BFR MAC CE or Truncated BFR MAC CE which contains beam failure information of that Scell. All BFRs triggered for a BFD-RS set of an S cell shall be cancelled when a MAC PDU is transmitted and this PDU includes an Enhanced BFR MAC CE or Truncated Enhanced BFR MAC CE which contains beam failure recovery information of that BFD-RS set of the Scell.

According to the above procedure, RA procedure is initiated if BFR for both BFD-RS sets of the SpCell are triggered and pending. In this case enhanced BFR MAC CE or a truncated enhanced BFR MAC CE is transmitted in Msg3/MsgA during the random access procedure.

In one approach, if beam failure is detected on both TRPs (i.e., BFD-RS sets) of SpCell, enhanced BFR MAC CE with beam failure recovery information of both TRPs is transmitted to gNB. Enhanced BFR MAC CE is included in Msg3/MsgA. This approach requires UL grant size for MsgA/Msg3 to be large (>56 bits). The number of bits required for enhanced BFR MAC CE is 40 bits (2-byte MAC sub header+3-byte MAC CE payload (1 octet bitmap+2 byte of beam failure recovery info)). The number of bits for C-RNTI MAC CE is 24 bits. Note that C-RNTI MAC CE is also transmitted in Msg3/MsgA of random access procedure. The size of MsgA/msg3 is 56 bits (for preamble group A). So it is possible that enhanced BFR MAC CE cannot fit in the Msg3/MsgA.

In another approach, if beam failure is detected on both TRPs (i.e., BFD-RS sets) of SpCell, legacy BFR MAC CE is transmitted to gNB. Legacy BFR MAC CE is included in Msg3/MsgA. Legacy BFR MAC CE cannot provide the beam failure recovery information for both TRPs. Beam failure recovery information in legacy BFR MAC CE is one octet consisting of one AC field and one Candidate RS ID. Candidate RS ID is included if AC bit is set to 1 (i.e., when candidate beam is available).

In another approach, if beam failure is detected on both TRPs (i.e., BFD-RS sets) of SpCell, enhanced BFR MAC CE with beam failure recovery information of one TRP is transmitted to gNB. Another TRP's candidate beam is indicated by contention free RACH preamble. This approach works only if CFRA is supported.

So considering the above limitations some enhancement is needed if BFR for both BFD-RS sets of the SpCell are triggered and pending.

Method 1

Multiple transmission reception points (TRP) can be there in a serving cell. BFD/BFR is performed per TRP (i.e., per BFD-RS set of serving cell) of serving cell. In a serving cell supporting multiple TRPs, separate BFD-RS set (or list of BFD-RSs) and separate candidate beam list for each TRP is signaled by gNB. BFD-RS set refers to BFD-RSs which the UE measures for beam failure detection. A beam failure is detected for a TRP (i.e., BFD-RS set) of a serving cell if number of consecutive detected beam failure instances for the TRP (i.e., BFD-RS set) exceeds a configured maximum number (beamFailureInstanceMaxCount) within a configured time (beamFailureDetectionTimer). beamFailureDetectionTimer and beamFailureInstanceMaxCount is configured/signaled by gNB separately for each TRP (i.e., BFD-RS set) of serving cell. A Beam Failure Instance for a TRP (i.e., BFD-RS set) means that hypothetical PDCCH BLER determined based on measurement of beam failure detection RS is above a threshold for all beam failure detection RSs of the TRP (i.e., BFD-RS set). Upon beam failure instance for a TRP (i.e., BFD-RS set), lower layer, i.e., PHY sends indication to MAC. MAC entity in UE performs the following operation for each serving cell configured with multiple TRPs, i.e., BFD-RS sets:

The MAC entity shall for each Serving Cell configured for beam failure detection:

1> if the Serving Cell is configured with multiple BFD-RS sets, the MAC entity shall for each BFD-RS set of this Serving Cell:

2> if beam failure instance indication for a BFD-RS set has been received from lower layers:

3> start or restart the beamFailureDetectionTimer corresponding to the BFD-RS set;

3> increment BFI_COUNTER corresponding to the BFD-RS set by 1;

3> if BFI_COUNTER corresponding to the BFD-RS set>=beamFailureInstanceMaxCount:

4> trigger a BFR for this BFD-RS set of the Serving Cell;

2> if BFR for both BFD-RS sets of the Serving Cell are triggered and pending (i.e., not cancelled or not successfully completed for any of the BFD-RS set of the Serving Cell):

3> if the Serving Cell is SpCell:

4> initiate a Random Access procedure on the SpCell;

If 2 step RA is selected upon initiation of random access procedure, UE transmits PRACH preamble on PRACH and MsgA MAC PDU on PUSCH. C-RNTI MAC CE is included in the MsgA MAC PDU. (Truncated) Enhanced BFR MAC CE is also included in the MsgA MAC PDU. For (Truncated) enhanced BFR MAC CE included in MsgA MAC PDU, 1-byte MAC sub header is included where MAC sub header consists of two R bits (1 bit each), and one 6 bit LCID. LCID is the LCID reserved for (Truncated) enhanced BFR MAC CE. R bits are set to 0 s. (Truncated) Enhanced BFR MAC CE payload consists of one octet Ci/SP bitmap and 2 octet of beam failure recovery information (one octet for each TRP, i.e., BFD-RS set of SpCell). Beam failure recovery information of a TRP, i.e., BFD-RS set consists of indication for candidate beam is available or not, identity of TRP, i.e., BFD-RS set ID, candidate RS ID if candidate beam is available. C0 or SP bit in (Truncated) Enhanced BFR MAC CE is set to 1. Beam failure recovery information of Scell's TRP(s) is not included in the (Truncated) enhanced BFR MAC CE in MsgA MAC PDU.

If 4 step RA is selected upon initiation of random access procedure, UE transmits PRACH preamble on PRACH. UE then received RAR from gNB in RAR response window. RAR includes UL grant for Msg3 transmission. UE transmits Msg3 MAC PDU in the UL grant. C-RNTI MAC CE is included in the Msg3 MAC PDU. (Truncated) Enhanced BFR MAC CE is also included in the Msg3 MAC PDU. For (Truncated) enhanced BFR MAC CE included in Msg3 MAC PDU, 1-byte MAC sub header is included where MAC sub header consists of two R bits, and one 6 bit LCID. LCID is the LCID reserved for (Truncated) enhanced BFR MAC CE. R bits are set to 0s. (Truncated) Enhanced BFR MAC CE payload consists of one octet Ci/SP bitmap and 2 octet of beam failure recovery information (one octet for each TRP, i.e., BFD-RS set of SpCell). Beam failure recovery information of a TRP, i.e., BFD-RS set consists of indication for candidate beam is available or not, identity of TRP, i.e., BFD-RS set ID, candidate RS ID if candidate beam is available. C0 or SP bit in (Truncated) Enhanced BFR MAC CE is set to 1. Beam failure recovery information of Scell's TRP(s) is not included in the (Truncated) enhanced BFR MAC CE in Msg3 MAC PDU.

Other details of RA procedure are same as described earlier in the background.

4> cancel the pending SR triggered for BFR of a BFD-RS set of SpCell and stop the corresponding sr-Prohibit-Timer, if running. (Note that at time instance T1, BFR for one BFD-RS set is triggered and SR may be triggered if UL SCH resources are not available or if UL SCH resources are available but it cannot accommodate neither enhanced BFR MAC CE not truncated enhanced BFR MAC CE. Later at time instance T2, BFR for BFR for another BFD-RS set is triggered while the BFR for first BFD-RS set is still pending. In this case UE will RA procedure and cancel the pending SR).

2> if the Random Access procedure initiated triggered by BFR for both BFD-RS sets of the SpCell is successfully completed:

3> set BFI_COUNTER of each BFD-RS set of SpCell to 0.

3> beam failure recovery procedure is successfully completed.

2> if the beamFailureDetectionTimer of this BFD-RS set expires; or

2> if beamFailureDetectionTimer, beamFailureInstanceMaxCount, or any of the reference signals used for beam failure detection is reconfigured by upper layers associated with this BFD-RS set of the Serving Cell:

3> set BFI_COUNTER corresponding to the BFD-RS set to 0.

2> if a PDCCH addressed to C-RNTI indicating uplink grant for a new transmission is received for the HARQ process used for the transmission of the Enhanced BFR MAC CE or Truncated Enhanced BFR MAC CE which contains beam failure recovery information of this BFD-RS set of the Serving Cell; or 2> if the Scell is deactivated:

3> set BFI_COUNTER corresponding to the BFD-RS set to 0;

1> if the Beam Failure Recovery procedure determines that at least one BFR for BFD-RS set has been triggered and not cancelled for an Scell for which evaluation of the candidate beams has been completed; or 1> if the Beam Failure Recovery procedure determines that at least one BFR for BFD-RS set for only one BFD-RS set has been triggered and not cancelled for an SpCell for which evaluation of the candidate beams has been completed:

2> if UL-SCH resources are available for a new transmission and if the UL-SCH resources can accommodate the Enhanced BFR MAC CE plus its sub header as a result of LCP:
3> instruct the Multiplexing and Assembly procedure to generate the Enhanced BFR MAC CE.

In this case, 2 or 3-byte MAC sub header (depending on LCID/eLCID) is included for enhanced BFR MAC CE in MAC PDU. 2-byte MAC sub header if LCID is used for enhanced BFR MAC CE. 3-byte MAC sub header if eLCID is used for enhanced BFR MAC CE. UE also include 1 or 4 octet Ci/SP bitmap depending on highest serving cell index of Scells for which beam failure is detected for at least one TRP (i.e., BFD-RS set) and candidate beam evaluation is completed. A single octet bitmap is used when the highest ServCellIndex of this MAC entity's Scell for which beam failure is detected and the evaluation of the candidate beams has been completed is less than 8, otherwise four octets are used. Beam failure recovery information of Scell's TRP(s) can be included in the enhanced BFR MAC CE. Beam failure recovery information of a TRP, i.e., BFD-RS set consists of indication for candidate beam is available or not, identity of TRP, i.e., BFD-RS set ID, candidate RS ID if candidate beam is available.

2> else if UL-SCH resources are available for a new transmission and if the UL-SCH resources can accommodate the Truncated Enhanced BFR MAC CE plus its sub header as a result of LCP:
3> instruct the Multiplexing and Assembly procedure to generate the Truncated Enhanced BFR MAC CE.

In this case, 2 or 3-byte MAC sub header (depending on LCID/eLCID) is included for Truncated enhanced BFR MAC CE in MAC PDU. 2-byte MAC sub header if LCID is used for Truncated enhanced BFR MAC CE. 3-byte MAC sub header if eLCID is used for Truncated enhanced BFR MAC CE. UE also include 1 or 4 octet Ci/SP bitmap depending on highest serving cell index of S cells for which beam failure is detected for at least one TRP (i.e., BFD-RS set) and candidate beam evaluation is completed. A single octet bitmap is used when the highest ServCellIndex of this MAC entity's Scell for which beam failure is detected and the evaluation of the candidate beams has been completed is less than 8, otherwise four octets are used. Beam failure recovery information of S cell's TRP(s) can be included in the truncated enhanced BFR MAC CE.

2> else:
3> trigger the SR for beam failure recovery of each BFD-RS set for which BFR has been triggered, not cancelled, and for which evaluation of the candidate beams has been completed.

The MAC entity shall for each pending SR not triggered according to the BSR procedure for a Serving Cell:

1> if this SR was triggered by Pre-emptive BSR procedure (see clause 5.4.7) prior to the MAC PDU assembly and a MAC PDU containing the relevant Pre-emptive BSR MAC CE is transmitted; or
1> if this SR was triggered by beam failure recovery (see clause 5.17) of an Scell and a MAC PDU is transmitted and this PDU includes a BFR MAC CE or a Truncated BFR MAC CE which contains beam failure recovery information for this Scell; or
1> if this SR was triggered by beam failure recovery (see clause 5.17) for a BFD-RS set of a Serving Cell and a MAC PDU is transmitted and this PDU includes an Enhanced BFR MAC CE or a Truncated Enhanced BFR MAC CE which contains beam failure recovery information for this BFD-RS set of the Serving Cell; or
1> if this SR was triggered by beam failure recovery (see clause 5.17) of an Scell and this Scell is deactivated (see clause 5.9); or
1> if this SR was triggered by beam failure recovery (see clause 5.17) for a BFD-RS set of an Scell and this Scell is deactivated (see clause 5.9); or
1> if this SR was triggered by consistent LBT failure recovery (see clause 5.21) of an Scell and a MAC PDU is transmitted and the MAC PDU includes an LBT failure MAC CE that indicates consistent LBT failure for this Scell; or
1> if this SR was triggered by consistent LBT failure recovery (see clause 5.21) of an Scell and all the triggered consistent LBT failure(s) for this Scell are cancelled:
2> cancel the pending SR and stop the corresponding sr-ProhibitTimer, if running.

Figure 4:
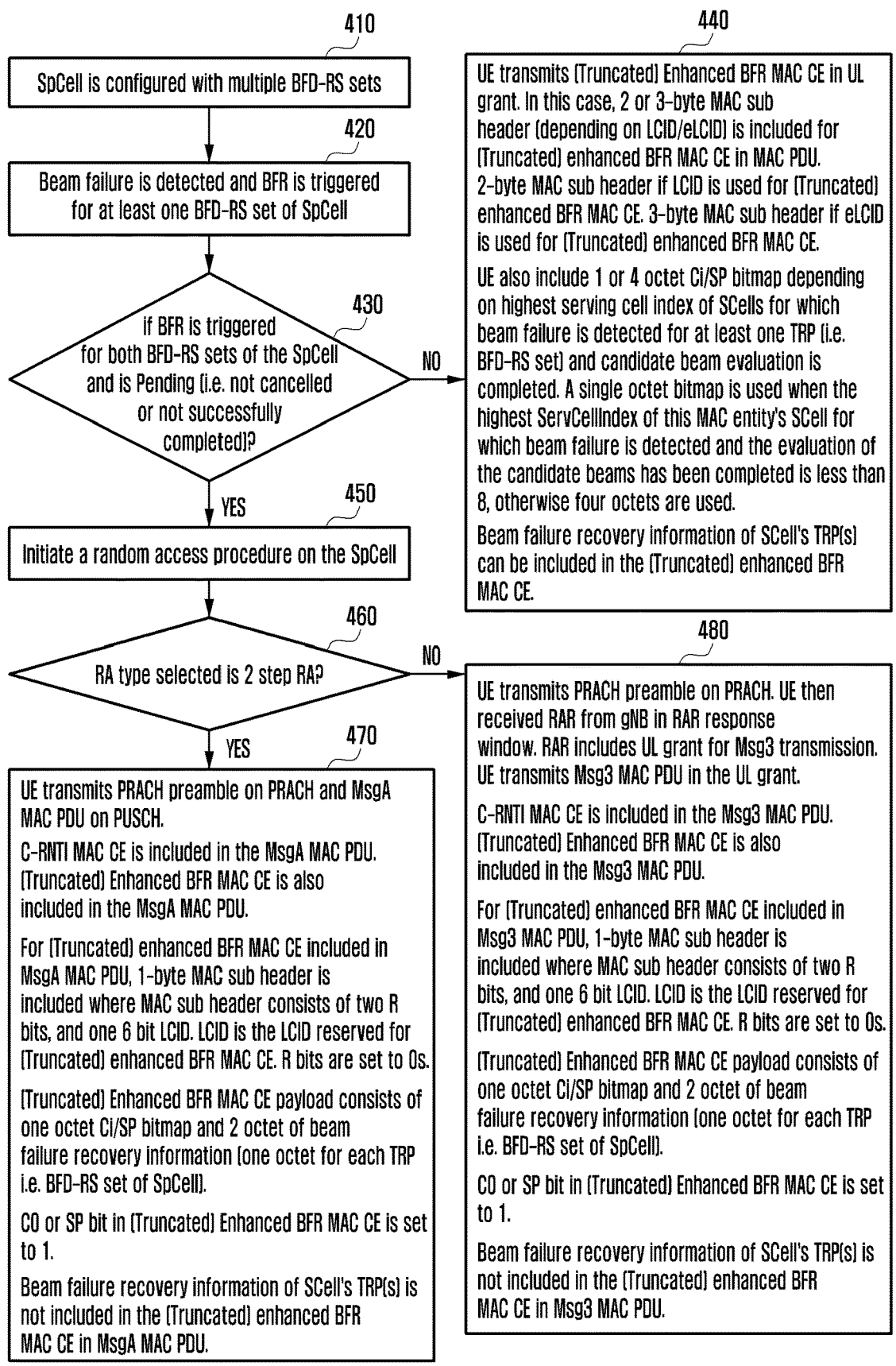
FIG. 4 is an example illustration of BFR for a special cell (SpCell) according to an embodiment of the disclosure.

FIG. 4 is an example illustration of BFR for SpCell according to an embodiment of the disclosure. A detailed description has been described in the above description.

Referring to FIG. 4, at operation 410, SpCell is configured with multiple BFD RS sets. At operation 420, beam failure is detected and BFR is triggered for at least one BFD RS set of the SpCell.

At operation 430, UE identifies whether BFR is triggered for both BFD RS sets of the SpCell and is pending (i.e., not cancelled or not successfully completed.

If at least one of BFR is not triggered for both BFD RS sets of the SpCell or is not pending, at operation 440, the UE transmits (truncated) enhanced BFR MAC CE in UL grant. In this case, 2 or 3 byte MAC sub header (depending on LCID/eLCID) is included for (truncated) enhanced BFR MAC CE in the MAC PDU. 2 byte MAC sub header is used, if LCID is used for (truncated) enhanced BFR MAC CE. And, 3 byte MAC sub header is used, if eLCID is used for (truncated) enhanced BFR MAC CE.

The UE also includes 1 or 4 octet Ci/SP bitmap depending on highest serving cell index of SCells for which beam failure is detected for at least one TRP (i.e., BFR RS set) and candidate beam evaluation is completed. A single octet bitmap is used when the highest ServCellIndex of this MAC entity's Scell for which beam failure is detected and the evaluation of the candidate beams has been completed is less than 8, otherwise four octets are used.

Beam failure recovery information of Scell's TRP(s) can be included in the (truncated) enhanced BFR MAC CE.

If BFR is triggered for both BFD RS sets of the SpCell and is pending (i.e., not cancelled or not successfully completed, at operation 450, the UE initiates a random access procedure on the SpCell.

At operation 460, the UE identifies whether selected RA type is 2 step RA.

If 2 step RA is selected, at operation 470, the UE transmits PRACH preamble on PRACH and MsgA MAC PDU on PUSCH.

C-RNTI MAC CE is included in the MsgA MAC PDU. (Truncated) enhanced BFR MAC CE is also included in the MsgA MAC PDU.

For (truncated) enhanced BFR MAC CE included in MsgA MAC PDU, 1 byte MAC sub header is included where MAC sub header consists of two R bits, and one 6 bit LCID. LCID is the LCID reserved for (truncated) enhanced BFR MAC CE. R bits are set to 0s. (Truncated) enhanced BFR MAC CE payload consists of one octet Ci/SP bitmap and 2 octet of beam failure recovery information (one octet for each TRP, i.e., BFD RS set of SpCell). C0 or SP bit in (truncated) enhanced BFR MAC CE is set to 1. Beam failure recovery information of Scell's TRP(s) is not included in the (truncated) enhanced BFR MAC CE in MsgA PDU.

If 4 step RA is selected, at operation 480, the UE transmits PRACH preamble on PRACH, and then the UE receives RAR from a gNB in RAP response window. The RAR includes UL grant for Msg3 transmission. The UE transmits Msg3 MAC PDU in the UL grant.

C-RNTI MAC CE is included in the Msg3 MAC PDU. (Truncated) enhanced BFR MAC CE is also included in the Msg3 MAC PDU.

For (truncated) enhanced BFR MAC CE included in Msg3 MAC PDU, 1 byte MAC sub header is included where MAC sub header consists of two R bits, and one 6 bit LCID. LCID is the LCID reserved for (truncated) enhanced BFR MAC CE. R bits are set to 0s. (Truncated) enhanced BFR MAC CE payload consists of one octet Ci/SP bitmap and 2 octet of beam failure recovery information (one octet for each TRP, i.e., BFD RS set of SpCell). C0 or SP bit in (truncated) enhanced BFR MAC CE is set to 1. Beam failure recovery information of Scell's TRP(s) is not included in the (truncated) enhanced BFR MAC CE in MsgA PDU.

In the (truncated) enhanced BFR MAC CE formats, the Ci field (i>0) corresponds to the serving cell with Serving Cell Index i. The Ci field indicates beam failure detection and the presence of beam failure recovery information of serving cell with Serving Cell Index i. The $C_i$ field set to 1 indicates that beam failure is detected for at least one TRP (i.e., BFD-RS set) and the beam failure recovery information of failed TRP(s) (i.e., BFD-RS set(s) for which beam failure is detected and candidate beam evaluation is completed) of serving cell with Serving Cell Index i is present. The $C_i$ field set to 0 indicates that beam failure is not detected for any TRP (i.e., BFD-RS set) or beam failure is detected but candidate beam evaluation is not completed for any TRP (i.e., BFD-RS set), in this case the beam failure recovery information of failed TRP(s) (i.e., BFD-RS set(s)) of serving cell with Serving Cell Index i is not present.

In the truncated enhanced BFR MAC CE format, if Ci bit is set to 1 for a serving cell index i, beam failure recovery information of serving cell may not be present (i.e., beam failure recovery information of any TRP of serving cell is not present) or partially present (i.e., in case both TRPs are failed, information about only one TRP may be included). Also LCID used in MAC sub header of enhanced BFR MAC CE format and truncated enhanced BFR MAC CE format is also different Method 2

Multiple transmission reception points (TRP) can be there in a serving cell. BFD/BFR is performed per TRP. In a serving cell supporting multiple TRPs, separate BFD-RS set (or BFD-RSs) and separate candidate beam list for each TRP is signaled by gNB. BFD-RS set refers to BFD-RSs which the UE measures for beam failure detection. A beam failure is detected for a TRP (i.e., BFD-RS set) of a serving cell if number of consecutive detected beam failure instances for the TRP (i.e., BFD-RS set) exceeds a configured maximum number (beamFailureInstanceMaxCount) within a configured time (beamFailureDetectionTimer). beamFailureDetectionTimer and beamFailureInstanceMaxCount is configured/signaled by gNB separately for each TRP (i.e., BFD-RS set) of serving cell. A Beam Failure Instance for a TRP (i.e., BFD-RS set) means that hypothetical PDCCH BLER determined based on measurement of beam failure detection RS is above a threshold for all beam failure detection RSs of the TRP (i.e., BFD-RS set). Upon beam failure instance for a TRP (i.e., BFD-RS set), lower layer, i.e., PHY sends indication to MAC. MAC entity in UE performs the following operation for each serving cell configured with multiple TRPs, i.e., BFD-RS sets:

The MAC entity shall for each Serving Cell configured for beam failure detection:
1> if the Serving Cell is configured with multiple BFD-RS sets, the MAC entity shall for each BFD-RS set of this Serving Cell:
2> if beam failure instance indication for a BFD-RS set has been received from lower layers:
3> start or restart the beamFailureDetectionTimer corresponding to the BFD-RS set;
3> increment BFI_COUNTER corresponding to the BFD-RS set by 1;
3> if BFI_COUNTER corresponding to the BFD-RS set>=beamFailureInstanceMaxCount:
4> trigger a BFR for this BFD-RS set of the Serving Cell;
2> if BFR for both BFD-RS sets of the Serving Cell are triggered and pending (i.e., not cancelled or not successfully completed):
3> if the Serving Cell is SpCell:
4> initiate a Random Access procedure on the SpCell;

If 2 step RA is selected upon initiation of random access procedure, UE transmits PRACH preamble on PRACH and MsgA MAC PDU on PUSCH. C-RNTI MAC CE is included in the MsgA MAC PDU. (Truncated) Enhanced BFR MAC CE is also included in the MsgA MAC PDU.

If UL SCH resource for MsgA payload can accommodate (Truncated) enhanced BFR MAC CE with beam failure recovery information (i.e., information indicating whether candidate beam is available or not, identity of TRP, i.e., BFD-RS set ID, candidate RS ID if candidate beam is available) of both TRPs (i.e., BFD-RS sets) of SpCell in addition to C-RNTI MAC CE: Include (Truncated) enhanced BFR MAC CE with beam failure recovery information of both TRPs (i.e., BFD-RS sets) of SpCell. Beam failure recovery information of Scell's TRP(s) (i.e., BFD-RS sets) may be included depending on the available size (i.e., bits) in MsgA MAC PDU.

Else If UL SCH resource for MsgA payload can accommodate (Truncated) enhanced BFR MAC CE with beam failure recovery information of only one TRP (i.e., BFD-RS set) of SpCell in addition to C-RNTI MAC CE: Include (Truncated) enhanced BFR MAC CE with beam failure recovery information of only one TRP (i.e., BFD-RS set) of SpCell. Beam failure recovery information of Scell's TRP(s) (i.e., BFD-RS sets) are not included. In this case, there is not enough bits to include beam failure recovery information of both TRPs of SpCell, this means that there is not enough bits for beam failure recovery information of SCell's TRPs and hence they are not included.

Else:

Include (Truncated) enhanced BFR MAC CE without beam failure recovery information of any TRP (i.e., BFD-RS set) of SpCell. Beam failure recovery information of Scell's TRP(s) are not included. In this case, there is not enough bits to include beam failure recovery information of any TRP of SpCell, this means that there is not enough bits for beam failure recovery information of SCell's TRPs and hence they are not included.

If 4 step RA is selected upon initiation of random access procedure, UE transmits PRACH preamble on PRACH. UE then received RAR from gNB in RAR response window. RAR includes UL grant for Msg3 transmission. UE transmits Msg3 MAC PDU in the UL grant. C-RNTI MAC CE is included in the Msg3 MAC PDU. (Truncated) Enhanced BFR MAC CE is also included in the Msg3 MAC PDU.

If UL SCH resource for Msg3 payload can accommodate (Truncated) enhanced BFR MAC CE with beam failure recovery information (i.e., information indicating whether candidate beam is available or not, identity of TRP i.e., BFD-RS set ID, candidate RS ID if candidate beam is available) of both TRPs (i.e., BFD-RS sets) of SpCell in addition to C-RNTI MAC CE: Include (Truncated) enhanced BFR MAC CE with beam failure recovery information of both TRPs (i.e., BFD-RS sets) of SpCell. Beam failure recovery information of Scell's TRP(s) (i.e., BFD-RS sets) may be included depending on the available size (i.e., bits) in Msg3 MAC PDU.

Else If UL SCH resource for Msg3 payload can accommodate (Truncated) enhanced BFR MAC CE with beam failure recovery information of only one TRP (i.e., BFD-RS set) of SpCell in addition to C-RNTI MAC CE: Include (Truncated) enhanced BFR MAC CE with beam failure recovery information of only one TRP (i.e., BFD-RS set) of SpCell. Beam failure recovery information of Scell's TRP(s) (i.e., BFD-RS sets) are not included. In this case, there is not enough bits to include beam failure recovery information of both TRPs of SpCell, this means that there is not enough bits for beam failure recovery information of SCell's TRPs and hence they are not included.

Else:
Include (Truncated) enhanced BFR MAC CE without beam failure recovery information of any TRP (i.e., BFD-RS set) of SpCell. Beam failure recovery information of Scell's TRP(s) are not included. In this case, there is not enough bits to include beam failure recovery information of any TRP of SpCell, this means that there is not enough bits for beam failure recovery information of SCell's TRPs and hence they are not included.

Other details of RA procedure are same as described earlier in the background.

4> cancel the pending SR triggered for BFR of a BFD-RS set of SpCell and stop the corresponding sr-Prohibit-Timer, if running. (Note that at time instance T1, BFR for one BFD-RS set is triggered and SR may be triggered if UL SCH resources are not available or if UL SCH resources are available but it cannot accommodate neither enhanced BFR MAC CE not truncated enhanced BFR MAC CE. Later at time instance T2, BFR for BFR for another BFD-RS set is triggered while the BFR for first BFD-RS set is still pending. In this case UE will RA procedure and cancel the pending SR).

2> if the Random Access procedure initiated triggered by BFR for both BFD-RS sets of the SpCell is successfully completed:

3> set BFI_COUNTER of each BFD-RS set of SpCell to 0.

3> beam failure recovery procedure is successfully completed.

2> if the beamFailureDetectionTimer of this BFD-RS set expires; or

2> if beamFailureDetectionTimer, beamFailureInstanceMaxCount, or any of the reference signals used for beam failure detection is reconfigured by upper layers associated with this BFD-RS set of the Serving Cell:

3> set BFI_COUNTER corresponding to the BFD-RS set to 0.

2> if a PDCCH addressed to C-RNTI indicating uplink grant for a new transmission is received for the HARQ process used for the transmission of the Enhanced BFR MAC CE or Truncated Enhanced BFR MAC CE which contains beam failure recovery information of this BFD-RS set of the Serving Cell; or 2> if the Scell is deactivated:

3> set BFI_COUNTER corresponding to the BFD-RS set to 0;

1> if the Beam Failure Recovery procedure determines that at least one BFR for BFD-RS set has been triggered and not cancelled for an Scell for which evaluation of the candidate beams has been completed; or 1> if the Beam Failure Recovery procedure determines that at least one BFR for BFD-RS set for only one BFD-RS set has been triggered and not cancelled for an SpCell for which evaluation of the candidate beams has been completed:

2> if UL-SCH resources are available for a new transmission and if the UL-SCH resources can accommodate the Enhanced BFR MAC CE plus its sub header as a result of LCP:

3> instruct the Multiplexing and Assembly procedure to generate the Enhanced BFR MAC CE.

In this case, 2 or 3-byte MAC sub header (depending on LCID/eLCID) is included for enhanced BFR MAC CE in MAC PDU. 2-byte MAC sub header if LCID is used for enhanced BFR MAC CE. 3-byte MAC sub header if eLCID is used for enhanced BFR MAC CE. UE also include 1 or 4 octet Ci/SP bitmap depending on highest serving cell index of Scells for which beam failure is detected for at least one TRP (i.e., BFD-RS set) and candidate beam evaluation is completed. A single octet bitmap is used when the highest ServCellIndex of this MAC entity's Scell for which beam failure is detected and the evaluation of the candidate beams has been completed is less than 8, otherwise four octets are used. Beam failure recovery information of Scell's TRP(s) can be included in the enhanced BFR MAC CE.

2> else if UL-SCH resources are available for a new transmission and if the UL-SCH resources can accommodate the Truncated Enhanced BFR MAC CE plus its sub header as a result of LCP:

3> instruct the Multiplexing and Assembly procedure to generate the Truncated Enhanced BFR MAC CE.

In this case, 2 or 3-byte MAC sub header (depending on LCID/eLCID) is included for Truncated enhanced BFR MAC CE in MAC PDU. 2-byte MAC sub header if LCID is used for Truncated enhanced BFR MAC CE. 3-byte MAC sub header if eLCID is used for Truncated Enhanced BFR MAC CE. UE also include 1 or 4 octet Ci/SP bitmap depending on highest serving cell index of S cells for which beam failure is detected for at least one TRP (i.e., BFD-RS set) and candidate beam evaluation is completed. A single octet bitmap is used when the highest ServCellIndex of this MAC entity's Scell for which beam failure is detected and the evaluation of the candidate beams has been completed is less than 8, otherwise four octets are used. Beam failure recovery information of S cell's TRP(s) can be included in the truncated enhanced BFR MAC CE.

2> else:

3> trigger the SR for beam failure recovery of each BFD-RS set for which BFR has been triggered, not cancelled, and for which evaluation of the candidate beams has been completed.

The MAC entity shall for each pending SR not triggered according to the BSR procedure for a Serving Cell:

1> if this SR was triggered by Pre-emptive BSR procedure (see clause 5.4.7) prior to the MAC PDU assembly and a MAC PDU containing the relevant Pre-emptive BSR MAC CE is transmitted; or 1> if this SR was triggered by beam failure recovery (see clause 5.17) of an Scell and a MAC PDU is transmitted and this PDU includes a BFR MAC CE or a Truncated BFR MAC CE which contains beam failure recovery information for this Scell; or 1> if this SR was triggered by beam failure recovery (see clause 5.17) for a BFD-RS set of a Serving Cell and a MAC PDU is transmitted and this PDU includes an Enhanced BFR MAC CE or a Truncated Enhanced BFR MAC CE which contains beam failure recovery information for this BFD-RS set of the Serving Cell; or 1> if this SR was triggered by beam failure recovery (see clause 5.17) of an Scell and this Scell is deactivated (see clause 5.9); or 1> if this SR was triggered by beam failure recovery (see clause 5.17) for a BFD-RS set of an Scell and this Scell is deactivated (see clause 5.9); or 1> if this SR was triggered by consistent LBT failure recovery (see clause 5.21) of an Scell and a MAC PDU is transmitted and the MAC PDU includes an LBT failure MAC CE that indicates consistent LBT failure for this Scell; or 1> if this SR was triggered by consistent LBT failure recovery (see clause 5.21) of an Scell and all the triggered consistent LBT failure(s) for this Scell are cancelled:

2> cancel the pending SR and stop the corresponding sr-ProhibitTimer, if running.

Figure 5:
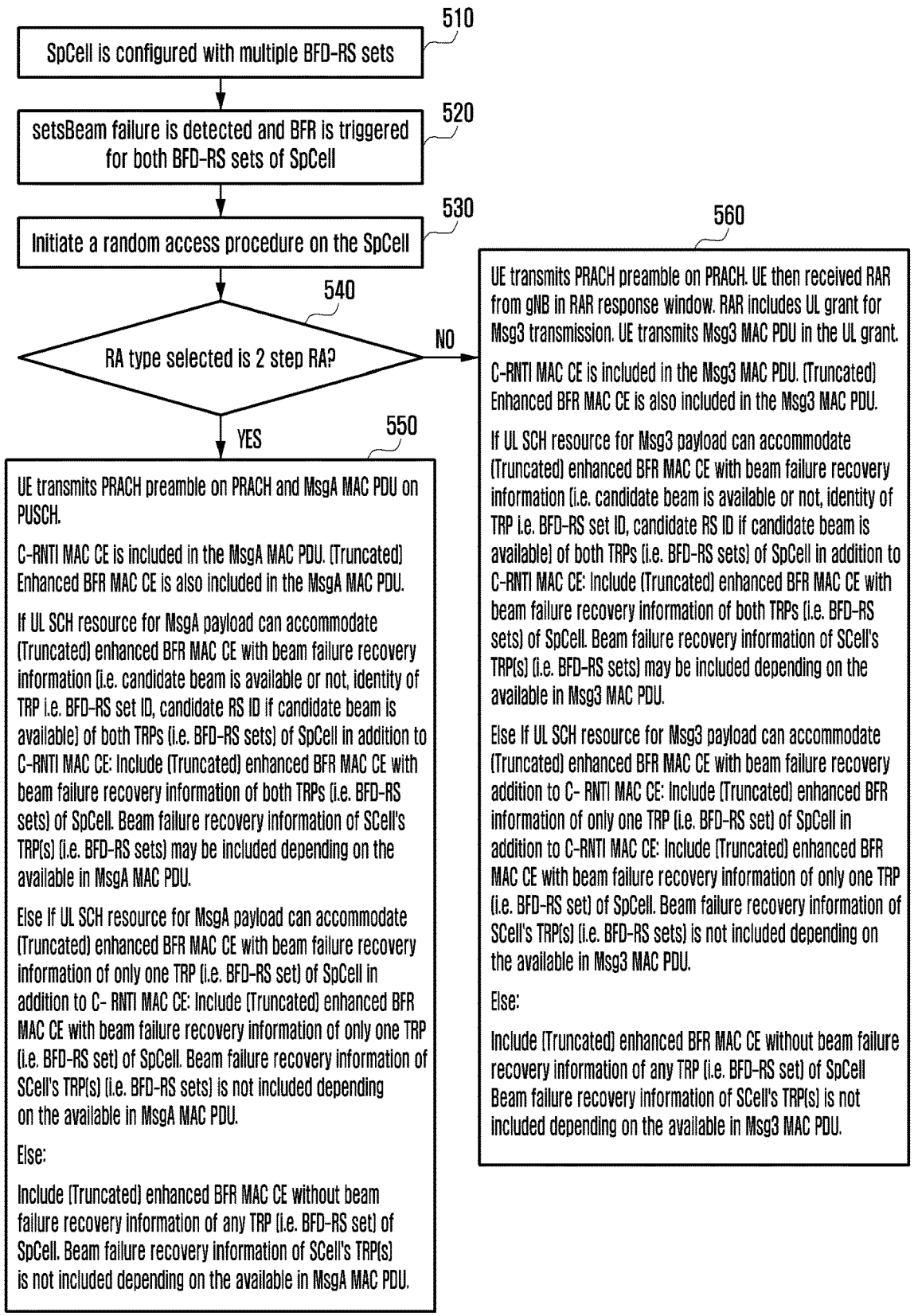
FIG. 5 is an example illustration of BFR for SpCell according to an embodiment of the disclosure.

FIG. 5 is an example illustration of BFR for SpCell according to an embodiment of the disclosure. A detailed description has been described in the above description.

Referring to FIG. 5, at operation 510, SpCell is configured with multiple BFD RS sets. At operation 520, beam failure is detected and BFR is triggered for both BFD RS sets of the SpCell.

At operation 530, the UE initiates a random access procedure on the SpCell.

At operation 540, the UE identifies whether selected RA type is 2 step RA.

If 2 step RA is selected, at operation 550, the UE transmits PRACH preamble on PRACH and MsgA MAC PDU on PUSCH.

C-RNTI MAC CE is included in the MsgA MAC PDU. (Truncated) enhanced BFR MAC CE is also included in the MsgA MAC PDU.

If UL SCH resources for MsgA payload can accommodate (truncated) enhanced BFR MAC CE with beam failure recovery information (i.e., information indicating whether candidate beam is available or not, identity of TRP, i.e., BFD-RS set ID, candidate RS ID if candidate beam is available) of both TRPs (i.e., BFD-RS sets) of SpCell in addition to C-RNTI MAC CE, the MsgA MAC PDU includes (truncated) enhanced BFR MAC CE with beam failure recovery information of both TRPs (i.e., BFD-RS sets) of SpCell. Beam failure recovery information of SCell's TRP(s) (i.e., BFD-RS sets) may be included depending on the available in MsgA MAC PDU.

Else if UL SCH resource for MsgA payload can accommodate (truncated) enhanced BFR MAC CE with beam failure recovery information of only one TRP (i.e., BFD-RS set) of SpCell in addition to C-RNTI MAC CE, the MsgA MAC PDU includes (truncated) enhanced BFR MAC CE with beam failure recovery information of only one TRP (i.e., BFD-RS set) of SpCell. Beam failure recovery information of SCell's TRP(s) (i.e., BFD-RS sets) is not included depending on the available in MsgA MAC PDU.

Else, the MsgA MAC PDU includes (truncated) enhanced BFR MAC CE without beam failure recovery information of any TRP (i.e., BFD-RS set) of SpCell. Beam failure recovery information of SCell's TRP(s) is not included depending on the available in MsgA MAC PDU.

If 4 step RA is selected, at operation 560, the UE transmits PRACH preamble on PRACH, and then the UE receives RAR from a gNB in RAP response window. The RAR includes UL grant for Msg3 transmission. The UE transmits Msg3 MAC PDU in the UL grant.

C-RNTI MAC CE is included in the Msg3 MAC PDU. (Truncated) Enhanced BFR MAC CE is also included in the Msg3 MAC PDU.

If UL SCH resource for Msg3 payload can accommodate (truncated) enhanced BFR MAC CE with beam failure recovery information (i.e., information indicating whether candidate beam is available or not, identity of TRP, i.e., BFD-RS set ID, candidate RS ID if candidate beam is available) of both TRPs (i.e., BFD-RS sets) of SpCell in addition to C-RNTI MAC CE, the Msg3 MAC PDU includes (truncated) enhanced BFR MAC CE with beam failure recovery information of both TRPs (i.e., BFD-RS sets) of SpCell. Beam failure recovery information of SCell's TRP(s) (i.e., BFD-RS sets) may be included depending on the available in Msg3 MAC PDU.

Else if UL SCH resource for Msg3 payload can accommodate (truncated) enhanced BFR MAC CE with beam failure recovery information of only one TRP (i.e., BFD-RS set) of SpCell in addition to C-RNTI MAC CE, the Msg3 MAC PDU includes (truncated) enhanced BFR MAC CE with beam failure recovery information of only one TRP (i.e., BFD-RS set) of SpCell. Beam failure recovery information of SCell's TRP(s) (i.e., BFD-RS sets) is not included depending on the available in Msg3 MAC PDU.

Else, the Msg3 MAC PDU includes (truncated) enhanced BFR MAC CE without beam failure recovery information of any TRP (i.e., BFD-RS set) of SpCell. Beam failure recovery information of SCell's TRP(s) is not included depending on the available in Msg3 MAC PDU.

In the (truncated) enhanced BFR MAC CE formats, the Ci field (i>0) corresponds to the serving cell with Serving Cell Index i. The Ci field indicates beam failure detection and the presence of beam failure recovery information of serving cell with Serving Cell Index i. The $C_i$ field set to 1 indicates that beam failure is detected for at least one TRP (i.e., BFD-RS set) and the beam failure recovery information of failed TRP(s) (i.e., BFD-RS set (s) for which beam failure is detected and candidate beam evaluation is completed) of serving cell with Serving Cell Index i is present. The $C_i$ field set to 0 indicates that beam failure is not detected for any TRP (i.e., BFD-RS set) or beam failure is detected but candidate beam evaluation is not completed for any TRP (i.e., BFD-RS set), in this case the beam failure recovery information of failed TRP(s) (i.e., BFD-RS set (s)) of serving cell with Serving Cell Index i is not present.

In the truncated enhanced BFR MAC CE format, if Ci bit is set to 1 for a serving cell index i, beam failure recovery information of serving cell may not be present (i.e., beam failure recovery information of any TRP of serving cell is not present) or partially present (i.e., in case both TRPs are failed, information about only one TRP may be included). Also LCID used in MAC sub header of enhanced BFR MAC CE format and truncated enhanced BFR MAC CE format is also different Method 3

Multiple transmission reception points (TRP) can be there in a serving cell. BFD/BFR is performed per TRP. In a serving cell supporting multiple TRPs, separate BFD-RS set (or BFD-RSs) and separate candidate beam list for each TRP is signaled by gNB. BFD-RS set refers to BFD-RSs which the UE measures for beam failure detection. A beam failure is detected for a TRP (i.e., BFD-RS set) of a serving cell if number of consecutive detected beam failure instances for the TRP (i.e., BFD-RS set) exceeds a configured maximum number (beamFailureInstanceMaxCount) within a configured time (beamFailureDetectionTimer). beamFailureDetectionTimer and beamFailureInstanceMaxCount is configured/signaled by gNB separately for each TRP (i.e., BFD-RS set) of serving cell. A Beam Failure Instance for a TRP (i.e., BFD-RS set) means that hypothetical PDCCH BLER determined based on measurement of beam failure detection RS is above a threshold for all beam failure detection RSs of the TRP (i.e., BFD-RS set). Upon beam failure instance for a TRP (i.e., BFD-RS set), lower layer, i.e., PHY sends indication to MAC. MAC entity in UE performs the following operation for each serving cell configured with multiple TRPs, i.e., BFD-RS sets:

The MAC entity shall for each Serving Cell configured for beam failure detection:
1> if the Serving Cell is configured with multiple BFD-RS sets, the MAC entity shall for each BFD-RS set of this Serving Cell:
2> if beam failure instance indication for a BFD-RS set has been received from lower layers:
3> start or restart the beamFailureDetectionTimer corresponding to the BFD-RS set;
3> increment BFI_COUNTER corresponding to the BFD-RS set by 1;
3> if BFI_COUNTER corresponding to the BFD-RS set>=beamFailureInstanceMaxCount:
4> trigger a BFR for this BFD-RS set of the Serving Cell;
2> if BFR for both BFD-RS sets of the Serving Cell are triggered and pending (i.e., not cancelled or not successfully completed):
3> if the Serving Cell is SpCell:
4> initiate a Random Access procedure on the SpCell;

If 2 step RA is selected upon initiation of random access procedure, UE transmits PRACH preamble on PRACH and MsgA MAC PDU on PUSCH. C-RNTI MAC CE is included in the MsgA MAC PDU.

If UL SCH resource for MsgA payload can accommodate (Truncated) enhanced BFR MAC CE with beam failure recovery information (i.e., information indicating whether candidate beam is available or not, identity of TRP, i.e., BFD-RS set ID, candidate RS ID if candidate beam is available) of both TRPs (i.e., BFD-RS sets) of SpCell in addition to C-RNTI MAC CE: Include (Truncated) enhanced BFR MAC CE with beam failure recovery information of both TRPs (i.e., BFD-RS sets) of SpCell in MsgA MAC PDU. Beam failure recovery information of SCell's TRP(s) (i.e., BFD-RS sets) may be included depending on the available size (i.e., bits) in MsgA MAC PDU.

Else,

Include legacy (Truncated) BFR MAC CE in MsgA MAC PDU. The legacy BFR MAC CE does not include beam failure recovery information for SpCell. Legacy BFR MAC CE and enhanced BFR MAC CE uses different LCID/ELCID in MAC subheader.

If 4 step RA is selected upon initiation of random access procedure, UE transmits PRACH preamble on PRACH. UE then received RAR from gNB in RAR response window. RAR includes UL grant for Msg3 transmission. UE transmits Msg3 MAC PDU in the UL grant. C-RNTI MAC CE is included in the Msg3 MAC PDU.

If UL SCH resource for Msg3 payload can accommodate (Truncated) enhanced BFR MAC CE with beam failure recovery information (i.e., information indicating whether candidate beam is available or not, identity of TRP i.e., BFD-RS set ID, candidate RS ID if candidate beam is available) of both TRPs (i.e., BFD-RS sets) of SpCell in addition to C-RNTI MAC CE: Include (Truncated) enhanced BFR MAC CE with beam failure recovery information of both TRPs (i.e., BFD-RS sets) of SpCell in Msg3 MAC PDU. Beam failure recovery information of SCell's TRP(s) (i.e., BFD-RS sets) may be included depending on the available size (i.e., bits) in Msg3 MAC PDU.

Else,

Include legacy (Truncated) BFR MAC CE in Msg3 MAC PDU. The legacy BFR MAC CE does not include beam failure recovery information for SpCell. Legacy BFR MAC CE and enhanced BFR MAC CE uses different LCID/ELCID in MAC subheader.

Other details of RA procedure are same as described earlier in the background.
4> cancel the pending SR triggered for BFR of a BFD-RS set of SpCell and stop the corresponding sr-Prohibit-Timer, if running. (Note that at time instance T1, BFR for one BFD-RS set is triggered and SR may be triggered if UL SCH resources are not available or if UL SCH resources are available but it cannot accommodate neither enhanced BFR MAC CE not truncated enhanced BFR MAC CE. Later at time instance T2, BFR for BFR for another BFD-RS set is triggered while the BFR for first BFD-RS set is still pending. In this case UE will RA procedure and cancel the pending SR).
2> if the Random Access procedure initiated triggered by BFR for both BFD-RS sets of the SpCell is successfully completed:
3> set BFI_COUNTER of each BFD-RS set of SpCell to 0.
3> beam failure recovery procedure is successfully completed.
2> if the beamFailureDetectionTimer of this BFD-RS set expires; or
2> if beamFailureDetectionTimer, beamFailureInstanceMaxCount, or any of the reference signals used for beam failure detection is reconfigured by upper layers associated with this BFD-RS set of the Serving Cell:
3> set BFI_COUNTER corresponding to the BFD-RS set to 0.
2> if a PDCCH addressed to C-RNTI indicating uplink grant for a new transmission is received for the HARQ process used for the transmission of the Enhanced BFR MAC CE or Truncated Enhanced BFR MAC CE which contains beam failure recovery information of this BFD-RS set of the Serving Cell; or
2> if the SCell is deactivated:
3> set BFI_COUNTER corresponding to the BFD-RS set to 0;
1> if the Beam Failure Recovery procedure determines that at least one BFR for BFD-RS set has been triggered and not cancelled for an Scell for which evaluation of the candidate beams has been completed; or
1> if the Beam Failure Recovery procedure determines that at least one BFR for BFD-RS set for only one BFD-RS set has been triggered and not cancelled for an SpCell for which evaluation of the candidate beams has been completed:

2> if UL-SCH resources are available for a new transmission and if the UL-SCH resources can accommodate the Enhanced BFR MAC CE plus its sub header as a result of LCP:
  3> instruct the Multiplexing and Assembly procedure to generate the Enhanced BFR MAC CE.

In this case, 2 or 3-byte MAC sub header (depending on LCID/eLCID) is included for enhanced BFR MAC CE in MAC PDU. 2-byte MAC sub header if LCID is used for enhanced BFR MAC CE. 3-byte MAC sub header if eLCID is used for enhanced BFR MAC CE. UE also include 1 or 4 octet Ci/SP bitmap depending on highest serving cell index of Scells for which beam failure is detected for at least one TRP (i.e., BFD-RS set) and candidate beam evaluation is completed. A single octet bitmap is used when the highest ServCellIndex of this MAC entity's SCell for which beam failure is detected and the evaluation of the candidate beams has been completed is less than 8, otherwise four octets are used. Beam failure recovery information of SCell's TRP(s) can be included in the enhanced BFR MAC CE.

2> else if UL-SCH resources are available for a new transmission and if the UL-SCH resources can accommodate the Truncated Enhanced BFR MAC CE plus its sub header as a result of LCP:
  3> instruct the Multiplexing and Assembly procedure to generate the Truncated Enhanced BFR MAC CE.

In this case, 2 or 3-byte MAC sub header (depending on LCID/eLCID) is included for Truncated enhanced BFR MAC CE in MAC PDU. 2-byte MAC sub header if LCID is used for Truncated enhanced BFR MAC CE. 3-byte MAC sub header if eLCID is used for Truncated enhanced BFR MAC CE. UE also include 1 or 4 octet Ci/SP bitmap depending on highest serving cell index of SCells for which beam failure is detected for at least one TRP (i.e., BFD-RS set) and candidate beam evaluation is completed. A single octet bitmap is used when the highest ServCellIndex of this MAC entity's SCell for which beam failure is detected and the evaluation of the candidate beams has been completed is less than 8, otherwise four octets are used. Beam failure recovery information of S cell's TRP(s) can be included in the truncated enhanced BFR MAC CE.

2> else:
  3> trigger the SR for beam failure recovery of each BFD-RS set for which BFR has been triggered, not cancelled, and for which evaluation of the candidate beams has been completed.

The MAC entity shall for each pending SR not triggered according to the BSR procedure for a Serving Cell:
  1> if this SR was triggered by Pre-emptive BSR procedure (see clause 5.4.7) prior to the MAC PDU assembly and a MAC PDU containing the relevant Pre-emptive BSR MAC CE is transmitted; or
  1> if this SR was triggered by beam failure recovery (see clause 5.17) of an Scell and a MAC PDU is transmitted and this PDU includes a BFR MAC CE or a Truncated BFR MAC CE which contains beam failure recovery information for this Scell; or
  1> if this SR was triggered by beam failure recovery (see clause 5.17) for a BFD-RS set of a Serving Cell and a MAC PDU is transmitted and this PDU includes an Enhanced BFR MAC CE or a Truncated Enhanced BFR MAC CE which contains beam failure recovery information for this BFD-RS set of the Serving Cell; or
  1> if this SR was triggered by beam failure recovery (see clause 5.17) of an Scell and this Scell is deactivated (see clause 5.9); or
  1> if this SR was triggered by beam failure recovery (see clause 5.17) for a BFD-RS set of an Scell and this Scell is deactivated (see clause 5.9); or
  1> if this SR was triggered by consistent LBT failure recovery (see clause 5.21) of an Scell and a MAC PDU is transmitted and the MAC PDU includes an LBT failure MAC CE that indicates consistent LBT failure for this Scell; or
  1> if this SR was triggered by consistent LBT failure recovery (see clause 5.21) of an Scell and all the triggered consistent LBT failure(s) for this Scell are cancelled:
    2> cancel the pending SR and stop the corresponding sr-ProhibitTimer, if running.

Figure 6:
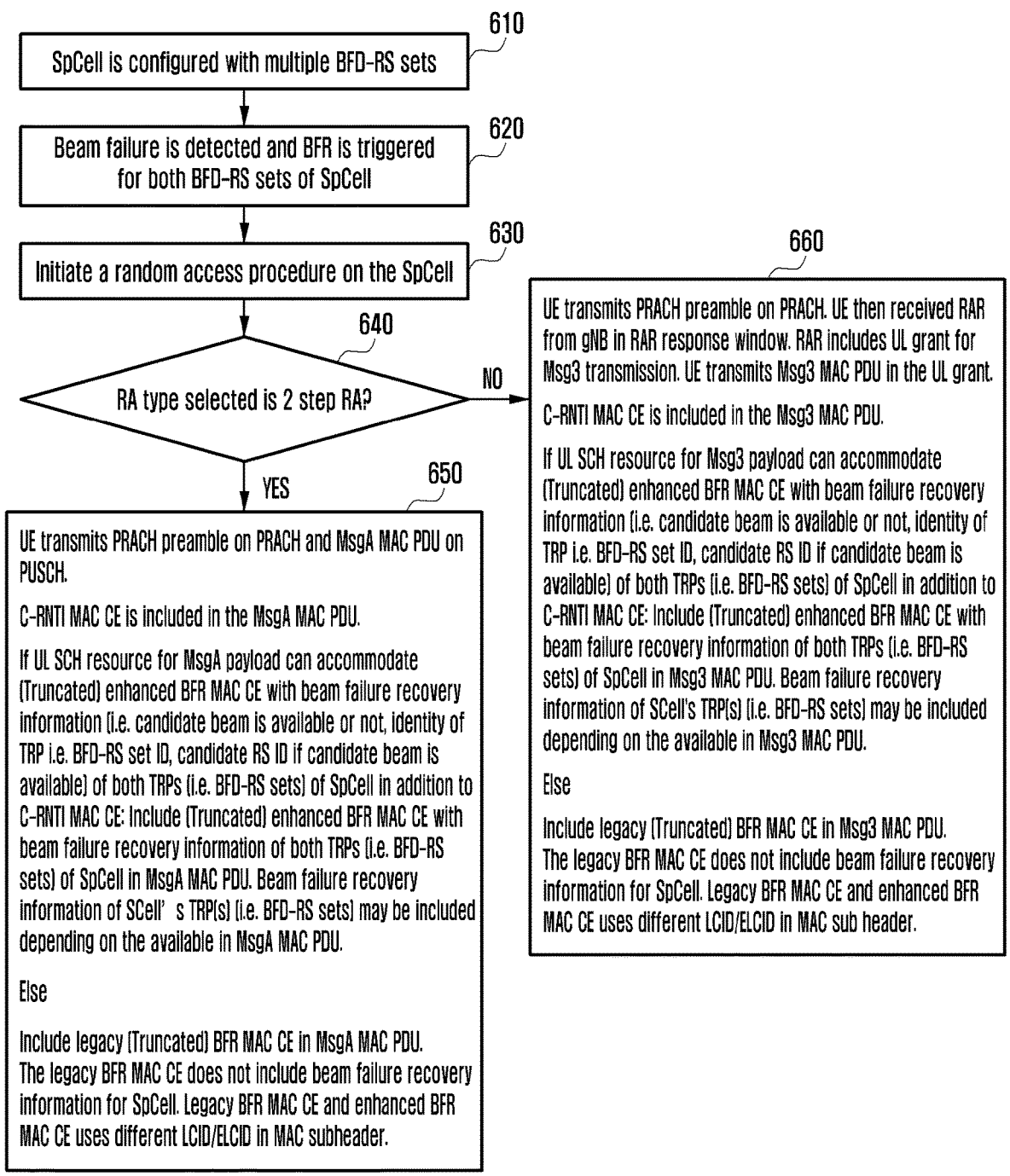
FIG. 6 is an example illustration of BFR for SpCell according to an embodiment of the disclosure.

FIG. 6 is an example illustration of BFR for SpCell according to an embodiment of the disclosure. A detailed description has been described in the above description.

Referring to FIG. 6, at operation 610, SpCell is configured with multiple BFD RS sets. At operation 620, beam failure is detected and BFR is triggered for both BFD RS sets of the SpCell.

At operation 630, the UE initiates a random access procedure on the SpCell.

At operation 640, the UE identifies whether selected RA type is 2 step RA.

If 2 step RA is selected, at operation 650, the UE transmits PRACH preamble on PRACH and MsgA MAC PDU on PUSCH.

C-RNTI MAC CE is included in the MsgA MAC PDU

If UL SCH resource for MsgA payload can accommodate (truncated) enhanced BFR MAC CE with beam failure recovery information (i.e., information indicating whether candidate beam is available or not, identity of TRP, i.e., BFD-RS set ID, candidate RS ID if candidate beam is available) of both TRPs (i.e., BFD-RS sets) of SpCell in addition to C-RNTI MAC CE, MsgA MAC PDU includes (truncated) enhanced BFR MAC CE with beam failure recovery information of both TRPs (i.e., BFD-RS sets) of SpCell. Beam failure recovery information of SCell's TRP(s) (i.e., BFD-RS sets) may be included depending on the available in MsgA MAC PDU.

Else, MsgA MAC PDU includes legacy (Truncated) BFR MAC CE. The legacy BFR MAC CE does not include beam failure recovery information for SpCell. Legacy BFR MAC CE and enhanced BFR MAC CE uses different LCID/ELCID in MAC subheader.

If 4 step RA is selected, at operation 660, the UE transmits PRACH preamble on PRACH, and then the UE receives RAR from a gNB in RAP response window. The RAR includes UL grant for Msg3 transmission. The UE transmits Msg3 MAC PDU in the UL grant.

C-RNTI MAC CE is included in the Msg3 MAC PDU.

If UL SCH resource for Msg3 payload can accommodate (truncated) enhanced BFR MAC CE with beam failure recovery information (i.e., information indicating whether candidate beam is available or not, identity of TRP, i.e., BFD-RS set ID, candidate RS ID if candidate beam is available) of both TRPs (i.e., BFD-RS sets) of SpCell in addition to C-RNTI MAC CE, Msg3 MAC PDU includes (truncated) enhanced BFR MAC CE with beam failure recovery information of both TRPs (i.e., BFD-RS sets) of SpCell. Beam failure recovery information of SCell's TRP(s) (i.e., BFD-RS sets) may be included depending on the available in Msg3 MAC PDU.

Else, Msg3 MAC PDU includes legacy (truncated) BFR MAC CE in Msg3 MAC PDU. The legacy BFR MAC CE does not include beam failure recovery information for SpCell. Legacy BFR MAC CE and enhanced BFR MAC CE uses different LCID/ELCID in MAC subheader.

Method 4

In this method a new criterion for preamble group B selection is added. If RA procedure is initiated for beam failure recovery of both BFD-RS sets of SpCell, UE selects preamble group B. This ensures that UL grant is large enough to include the enhanced BFR MAC CE.

Multiple transmission reception points (TRP) can be there in a serving cell. BFD/BFR is performed per TRP. In a serving cell supporting multiple TRPs, separate BFD-RS set (or BFD-RSs) and separate candidate beam list for each TRP is signaled by gNB. BFD-RS set refers to BFD-RSs which the UE measures for beam failure detection. A beam failure is detected for a TRP (i.e., BFD-RS set) of a serving cell if number of consecutive detected beam failure instances for the TRP (i.e., BFD-RS set) exceeds a configured maximum number (beamFailureInstanceMaxCount) within a configured time (beamFailureDetectionTimer). beamFailureDetectionTimer and beamFailureInstanceMaxCount is configured/signaled by gNB separately for each TRP (i.e., BFD-RS set) of serving cell. A Beam Failure Instance for a TRP (i.e., BFD-RS set) means that hypothetical PDCCH BLER determined based on measurement of beam failure detection RS is above a threshold for all beam failure detection RSs of the TRP (i.e., BFD-RS set). Upon beam failure instance for a TRP (i.e., BFD-RS set), lower layer, i.e., PHY sends indication to MAC. MAC entity in UE performs the following operation for each serving cell configured with multiple TRPs, i.e., BFD-RS sets:

The MAC entity shall for each Serving Cell configured for beam failure detection:
1> if the Serving Cell is configured with multiple BFD-RS sets, the MAC entity shall for each BFD-RS set of this Serving Cell:
2> if beam failure instance indication for a BFD-RS set has been received from lower layers:
3> start or restart the beamFailureDetectionTimer corresponding to the BFD-RS set;
3> increment BFI_COUNTER corresponding to the BFD-RS set by 1;
3> if BFI_COUNTER corresponding to the BFD-RS set>=beamFailureInstanceMaxCount:
4> trigger a BFR for this BFD-RS set of the Serving Cell;
2> if BFR for both BFD-RS sets of the Serving Cell are triggered and pending (i.e., not cancelled or not successfully completed):
3> if the Serving Cell is SpCell:
4> initiate a Random Access procedure on the SpCell;

If 2 step RA is selected upon initiation of random access procedure, for a random access attempt UE selects the preamble group (group A or group B) as follows:
if contention-free Random Access Resources for 2-step RA type have not been configured and if Random Access Preambles group has not yet been selected during the current Random Access procedure:
if Random Access Preambles group B for 2-step RA type is configured:
if the potential MSGA payload size (UL data available for transmission plus MAC sub header and, where required, MAC CEs) is greater than the ra-MsgA-SizeGroupA and the pathloss is less than PCMAX (of the Serving Cell performing the Random Access Procedure)—msgA-PreambleReceivedTargetPower—msgA-DeltaPreamble—messagePowerOffsetGroupB; or if the Random Access procedure was initiated for the CCCH logical channel and the CCCH SDU size plus MAC subheader is greater than ra-MsgA-SizeGroupA; or
if the random access procedure was initiated for beam failure recovery of both BFD-RS sets of SpCell:
select the Random Access Preambles group B.
else
select the Random Access Preambles group A.
else if Random Access Preambles group B for 2-step RA type is not configured:
select the Random Access Preambles group A.

UE then selects SSB and selects a Random Access Preamble randomly with equal probability from the Random Access Preambles associated with the selected SSB and the selected Random Access Preambles group. UE transmits PRACH preamble on PRACH and MsgA MAC PDU on PUSCH. C-RNTI MAC CE is included in the MsgA MAC PDU. (Truncated) enhanced BFR MAC CE with beam failure recovery information of both TRPs (i.e., BFD-RS sets) of SpCell is included in MsgA MAC PDU. Beam failure recovery information of SCell's TRP(s) (i.e., BFD-RS sets) may be included depending on the available in MsgA MAC PDU.

If 4 step RA is selected upon initiation of random access procedure, for a random access attempt UE selects the preamble group (group A or group B) as follows:
if the RA TYPE is not switched from 2-stepRA to 4-stepRA and if Msg3 buffer is empty:
if Random Access Preambles group B is configured:
if the potential Msg3 size (UL data available for transmission plus MAC sub header(s) and, where required, MAC CEs) is greater than ra-Msg3SizeGroupA and the pathloss is less than PCMAX (of the Serving Cell performing the Random Access Procedure)—preambleReceivedTargetPower—msg3-DeltaPreamble—messagePowerOffsetGroupB; or
if the Random Access procedure was initiated for the CCCH logical channel and the CCCH SDU size plus MAC sub header is greater than ra-Msg3SizeGroupA; or
if the random access procedure was initiated for beam failure recovery of both BFD-RS sets of SpCell:
select the Random Access Preambles group B.
else:
select the Random Access Preambles group A.
else if Random Access Preambles group B is not configured:
select the Random Access Preambles group A.
else (i.e., Msg3 is being retransmitted):
select the same group of Random Access Preambles as was used for the Random Access Preamble transmission attempt corresponding to the first transmission of Msg3.

UE then selects SSB and selects a Random Access Preamble randomly with equal probability from the Random Access Preambles associated with the selected SSB and the selected Random Access Preambles group UE transmits PRACH preamble on PRACH. UE then receives RAR from gNB in RAR response window. RAR includes UL grant for Msg3 transmission. UE transmits Msg3 MAC PDU in the UL grant. C-RNTI MAC CE is included in the Msg3 MAC PDU. (Truncated) enhanced BFR MAC CE with beam failure recovery information of both TRPs (i.e., BFD-RS sets) of SpCell is included in Msg3 MAC PDU. Beam failure recovery information of SCell's TRP(s) (i.e., BFD-RS sets) may be included depending on the available in Msg3 MAC PDU.

4> cancel the pending SR triggered for BFR of a BFD-RS set of SpCell and stop the corresponding sr-ProhibitTimer, if running. (Note that at time instance T1, BFR for one BFD-RS set is triggered and SR may be triggered if UL SCH resources are not available or if UL SCH resources are available but it cannot accommodate neither enhanced BFR MAC CE not truncated enhanced BFR MAC CE. Later at time instance T2, BFR for BFR for another BFD-RS set is triggered while the BFR for first BFD-RS set is still pending. In this case UE will RA procedure and cancel the pending SR).

2> if the Random Access procedure initiated triggered by BFR for both BFD-RS sets of the SpCell is successfully completed:

3> set BFI_COUNTER of each BFD-RS set of SpCell to 0.

3> beam failure recovery procedure is successfully completed.

2> if the beamFailureDetectionTimer of this BFD-RS set expires; or

2> if beamFailureDetectionTimer, beamFailureInstanceMaxCount, or any of the reference signals used for beam failure detection is reconfigured by upper layers associated with this BFD-RS set of the Serving Cell:

3> set BFI_COUNTER corresponding to the BFD-RS set to 0.

2> if a PDCCH addressed to C-RNTI indicating uplink grant for a new transmission is received for the HARQ process used for the transmission of the Enhanced BFR MAC CE or Truncated Enhanced BFR MAC CE which contains beam failure recovery information of this BFD-RS set of the Serving Cell; or 2> if the SCell is deactivated:

3> set BFI_COUNTER corresponding to the BFD-RS set to 0;

1> if the Beam Failure Recovery procedure determines that at least one BFR for BFD-RS set has been triggered and not cancelled for an Scell for which evaluation of the candidate beams has been completed; or 1> if the Beam Failure Recovery procedure determines that at least one BFR for BFD-RS set for only one BFD-RS set has been triggered and not cancelled for an SpCell for which evaluation of the candidate beams has been completed:

2> if UL-SCH resources are available for a new transmission and if the UL-SCH resources can accommodate the Enhanced BFR MAC CE plus its sub header as a result of LCP:

3> instruct the Multiplexing and Assembly procedure to generate the Enhanced BFR MAC CE.

In this case, 2 or 3-byte MAC sub header (depending on LCID/eLCID) is included for enhanced BFR MAC CE in MAC PDU. 2-byte MAC sub header if LCID is used for enhanced BFR MAC CE. 3-byte MAC sub header if eLCID is used for enhanced BFR MAC CE. UE also include 1 or 4 octet Ci/SP bitmap depending on highest serving cell index of Scells for which beam failure is detected for at least one TRP (i.e., BFD-RS set) and candidate beam evaluation is completed. A single octet bitmap is used when the highest ServCellIndex of this MAC entity's SCell for which beam failure is detected and the evaluation of the candidate beams has been completed is less than 8, otherwise four octets are used. Beam failure recovery information of SCell's TRP(s) can be included in the enhanced BFR MAC CE.

2> else if UL-SCH resources are available for a new transmission and if the UL-SCH resources can accommodate the Truncated Enhanced BFR MAC CE plus its sub header as a result of LCP:

3> instruct the Multiplexing and Assembly procedure to generate the Truncated Enhanced BFR MAC CE.

In this case, 2 or 3-byte MAC sub header (depending on LCID/eLCID) is included for Truncated enhanced BFR MAC CE in MAC PDU. 2-byte MAC sub header if LCID is used for Truncated enhanced BFR MAC CE. 3-byte MAC sub header if eLCID is used for Truncated enhanced BFR MAC CE. UE also include 1 or 4 octet Ci/SP bitmap depending on highest serving cell index of SCells for which beam failure is detected for at least one TRP (i.e., BFD-RS set) and candidate beam evaluation is completed. A single octet bitmap is used when the highest ServCellIndex of this MAC entity's SCell for which beam failure is detected and the evaluation of the candidate beams has been completed is less than 8, otherwise four octets are used. Beam failure recovery information of S cell's TRP(s) can be included in the truncated enhanced BFR MAC CE.

2> else:

3> trigger the SR for beam failure recovery of each BFD-RS set for which BFR has been triggered, not cancelled, and for which evaluation of the candidate beams has been completed.

The MAC entity shall for each pending SR not triggered according to the BSR procedure for a Serving Cell:

1> if this SR was triggered by Pre-emptive BSR procedure (see clause 5.4.7) prior to the MAC PDU assembly and a MAC PDU containing the relevant Pre-emptive BSR MAC CE is transmitted; or 1> if this SR was triggered by beam failure recovery (see clause 5.17) of an Scell and a MAC PDU is transmitted and this PDU includes a BFR MAC CE or a Truncated BFR MAC CE which contains beam failure recovery information for this Scell; or 1> if this SR was triggered by beam failure recovery (see clause 5.17) for a BFD-RS set of a Serving Cell and a MAC PDU is transmitted and this PDU includes an Enhanced BFR MAC CE or a Truncated Enhanced BFR MAC CE which contains beam failure recovery information for this BFD-RS set of the Serving Cell; or 1> if this SR was triggered by beam failure recovery (see clause 5.17) of an Scell and this Scell is deactivated (see clause 5.9); or 1> if this SR was triggered by beam failure recovery (see clause 5.17) for a BFD-RS set of an Scell and this Scell is deactivated (see clause 5.9); or 1> if this SR was triggered by consistent LBT failure recovery (see clause 5.21) of an Scell and a MAC PDU is transmitted and the MAC PDU includes an LBT failure MAC CE that indicates consistent LBT failure for this Scell; or 1> if this SR was triggered by consistent LBT failure recovery (see clause 5.21) of an Scell and all the triggered consistent LBT failure(s) for this Scell are cancelled:

2> cancel the pending SR and stop the corresponding sr-ProhibitTimer, if running.

Method 5

In this method is it proposed to define a new MAC CE for multi TRP BFR of SpCell (say Enhanced BFR MAC CE for SpCell) for transmitting in Msg3/MsgA of RA procedure initiated for beam failure recovery of both BFD-RS sets of SpCell. The new MAC CE includes:
C-RNTI
Beam failure recovery information of one or both TRPs
In case random access procedure is initiated for BFR of both BFD-RS sets of SpCell, C-RNTI MAC CE is not included in Msg3/MsgA. The advantage is that overhead of separate MAC subleaders for BFR MAC CE and C-RNTI MAC CE is avoided. The LCID/eLCID used for this Enhanced BFR MAC CE for SpCell can be different from other BFR MAC CEs.

Multiple transmission reception points (TRP) can be there in a serving cell. BFD/BFR is performed per TRP. In a serving cell supporting multiple TRPs, separate BFD-RS set (or BFD-RSs) and separate candidate beam list for each TRP is signaled by gNB. BFD-RS set refers to BFD-RSs which the UE measures for beam failure detection. A beam failure is detected for a TRP (i.e., BFD-RS set) of a serving cell if number of consecutive detected beam failure instances for the TRP (i.e., BFD-RS set) exceeds a configured maximum number (beamFailureInstanceMaxCount) within a configured time (beamFailureDetectionTimer). beamFailureDetectionTimer and beamFailureInstanceMaxCount is configured/signaled by gNB separately for each TRP (i.e., BFD-RS set) of serving cell. A Beam Failure Instance for a TRP (i.e., BFD-RS set) means that hypothetical PDCCH BLER determined based on measurement of beam failure detection RS is above a threshold for all beam failure detection RSs of the TRP (i.e., BFD-RS set). Upon beam failure instance for a TRP (i.e., BFD-RS set), lower layer, i.e., PHY sends indication to MAC. MAC entity in UE performs the following operation for each serving cell configured with multiple TRPs, i.e., BFD-RS sets:

The MAC entity shall for each Serving Cell configured for beam failure detection:
1> if the Serving Cell is configured with multiple BFD-RS sets, the MAC entity shall for each BFD-RS set of this Serving Cell:
2> if beam failure instance indication for a BFD-RS set has been received from lower layers:
3> start or restart the beamFailureDetectionTimer corresponding to the BFD-RS set;
3> increment BFI_COUNTER corresponding to the BFD-RS set by 1;
3> if BFI_COUNTER>=beamFailureInstanceMaxCount:
4> trigger a BFR for this BFD-RS set of the Serving Cell;
2> if BFR for both BFD-RS sets of the Serving Cell are triggered and pending (i.e., not cancelled or not successfully completed):
3> if the Serving Cell is SpCell:
4> initiate a Random Access procedure on the SpCell;
If 2 step RA is selected upon initiation of random access procedure, MsgA MAC PDU is generated as follows:
if this is the first MSGA transmission within this Random Access procedure:
if the transmission is not being made for the CCCH logical channel and if this random access procedure is not initiated for beam failure recovery of both BFD-RS sets of SpCell: indicate to the Multiplexing and assembly entity to include a C-RNTI MAC CE in the subsequent uplink transmission.
if the Random Access procedure was initiated for SpCell beam failure recovery and spCell-BFR-CBRA with value true is configured: indicate to the Multiplexing and assembly entity to include a BFR MAC CE or a Truncated BFR MAC CE in the subsequent uplink transmission.
else if this random access procedure is initiated for beam failure recovery of both BFD-RS sets of SpCell: indicate to the Multiplexing and assembly entity to include an enhanced BFR MAC CE for SpCell in the in the subsequent uplink transmission. This MAC CE includes C-RNTI and beam failure recovery information of one or both TRPs (i.e., BFD-RS sets) of SpCell.

Obtain the MAC PDU to transmit from the Multiplexing and assembly entity according to the HARQ information determined for the MSGA payload and store it in the MSGA buffer.

UE transmits PRACH preamble on PRACH and MsgA MAC PDU on PUSCH.

If 4 step RA is selected upon initiation of random access procedure, UE transmits PRACH preamble on PRACH. UE then receives RAR from gNB in RAR response window. RAR includes UL grant for Msg3 transmission. Msg3 MAC PDU is generated as follows:
if this is the first successfully received Random Access Response within this Random Access procedure:
if the transmission is not being made for the CCCH logical channel and if this random access procedure is not initiated for beam failure recovery of both BFD-RS sets of SpCell: indicate to the Multiplexing and assembly entity to include a C-RNTI MAC CE in the subsequent uplink transmission.
if the Random Access procedure was initiated for SpCell beam failure recovery and spCell-BFR-CBRA with value true is configured: indicate to the Multiplexing and assembly entity to include a BFR MAC CE or a Truncated BFR MAC CE in the subsequent uplink transmission.
else if this random access procedure is initiated for beam failure recovery of both BFD-RS sets of SpCell: indicate to the Multiplexing and assembly entity to include an enhanced BFR MAC CE for SpCell in the in the subsequent uplink transmission. This MAC CE includes C-RNTI and beam failure recovery information of one or both TRPs (i.e., BFD-RS sets) of SpCell.

Obtain the MAC PDU to transmit from the Multiplexing and assembly entity and store it in the Msg3 buffer.
UE transmits Msg3 MAC PDU.
4> cancel the pending SR triggered for BFR of a BFD-RS set of SpCell and stop the corresponding sr-ProhibitTimer, if running. (Note that at time instance T1, BFR for one BFD-RS set is triggered and SR may be triggered if UL SCH resources are not available or if UL SCH resources are available but it cannot accommodate neither enhanced BFR MAC CE not truncated enhanced BFR MAC CE. Later at time instance T2, BFR for BFR for another BFD-RS set is triggered while the BFR for first BFD-RS set is still pending. In this case UE will RA procedure and cancel the pending SR).
2> if the Random Access procedure initiated triggered by BFR for both BFD-RS sets of the SpCell is successfully completed:
3> set BFI_COUNTER of each BFD-RS set of SpCell to 0.
3> beam failure recovery procedure is successfully completed.
2> if the beamFailureDetectionTimer of this BFD-RS set expires; or
2> if beamFailureDetectionTimer, beamFailureInstanceMaxCount, or any of the reference signals used for beam failure detection is reconfigured by upper layers associated with this BFD-RS set of the Serving Cell:
3> set BFI_COUNTER corresponding to the BFD-RS set to 0.
2> if a PDCCH addressed to C-RNTI indicating uplink grant for a new transmission is received for the HARQ process used for the transmission of the Enhanced BFR MAC CE or Truncated Enhanced BFR MAC CE which contains beam failure recovery information of this BFD-RS set of the Serving Cell; or
2> if the SCell is deactivated:
3> set BFI_COUNTER corresponding to the BFD-RS set to 0;
1> if the Beam Failure Recovery procedure determines that at least one BFR for BFD-RS set has been triggered and not cancelled for an Scell for which evaluation of the candidate beams has been completed; or
1> if the Beam Failure Recovery procedure determines that at least one BFR for BFD-RS set for only one BFD-RS set has been triggered and not cancelled for an SpCell for which evaluation of the candidate beams has been completed:
2> if UL-SCH resources are available for a new transmission and if the UL-SCH resources can accommodate the Enhanced BFR MAC CE plus its sub header as a result of LCP:
3> instruct the Multiplexing and Assembly procedure to generate the Enhanced BFR MAC CE.

In this case, 2 or 3-byte MAC sub header (depending on LCID/eLCID) is included for enhanced BFR MAC CE in MAC PDU. 2-byte MAC sub header if LCID is used for enhanced BFR MAC CE. 3-byte MAC sub header if eLCID is used for enhanced BFR MAC CE. UE also include 1 or 4 octet Ci/SP bitmap depending on highest serving cell index of Scells for which beam failure is detected for at least one TRP (i.e., BFD-RS set) and candidate beam evaluation is completed. A single octet bitmap is used when the highest ServCellIndex of this MAC entity's SCell for which beam failure is detected and the evaluation of the candidate beams has been completed is less than 8, otherwise four octets are used. Beam failure recovery information of SCell's TRP(s) can be included in the enhanced BFR MAC CE.

2> else if UL-SCH resources are available for a new transmission and if the UL-SCH resources can accommodate the Truncated Enhanced BFR MAC CE plus its sub header as a result of LCP:
3> instruct the Multiplexing and Assembly procedure to generate the Truncated Enhanced BFR MAC CE.

In this case, 2 or 3-byte MAC sub header (depending on LCID/eLCID) is included for Truncated enhanced BFR MAC CE in MAC PDU. 2-byte MAC sub header if LCID is used for Truncated enhanced BFR MAC CE. 3-byte MAC sub header if eLCID is used for Truncated enhanced BFR MAC CE. UE also include 1 or 4 octet Ci/SP bitmap depending on highest serving cell index of SCells for which beam failure is detected for at least one TRP (i.e., BFD-RS set) and candidate beam evaluation is completed. A single octet bitmap is used when the highest ServCellIndex of this MAC entity's SCell for which beam failure is detected and the evaluation of the candidate beams has been completed is less than 8, otherwise four octets are used. Beam failure recovery information of S cell's TRP(s) can be included in the truncated enhanced BFR MAC CE.

2> else:
3> trigger the SR for beam failure recovery of each BFD-RS set for which BFR has been triggered, not cancelled, and for which evaluation of the candidate beams has been completed.

The MAC entity shall for each pending SR not triggered according to the BSR procedure for a Serving Cell:
1> if this SR was triggered by Pre-emptive BSR procedure (see clause 5.4.7) prior to the MAC PDU assembly and a MAC PDU containing the relevant Pre-emptive BSR MAC CE is transmitted; or
1> if this SR was triggered by beam failure recovery (see clause 5.17) of an Scell and a MAC PDU is transmitted and this PDU includes a BFR MAC CE or a Truncated BFR MAC CE which contains beam failure recovery information for this Scell; or
1> if this SR was triggered by beam failure recovery (see clause 5.17) for a BFD-RS set of a Serving Cell and a MAC PDU is transmitted and this PDU includes an Enhanced BFR MAC CE or a Truncated Enhanced BFR MAC CE which contains beam failure recovery information for this BFD-RS set of the Serving Cell; or
1> if this SR was triggered by beam failure recovery (see clause 5.17) of an Scell and this Scell is deactivated (see clause 5.9); or
1> if this SR was triggered by beam failure recovery (see clause 5.17) for a BFD-RS set of an Scell and this Scell is deactivated (see clause 5.9); or
1> if this SR was triggered by consistent LBT failure recovery (see clause 5.21) of an Scell and a MAC PDU is transmitted and the MAC PDU includes an LBT failure MAC CE that indicates consistent LBT failure for this Scell; or
1> if this SR was triggered by consistent LBT failure recovery (see clause 5.21) of an Scell and all the triggered consistent LBT failure(s) for this Scell are cancelled:
2> cancel the pending SR and stop the corresponding sr-ProhibitTimer, if running.

Method 6

Multiple transmission reception points (TRP) can be there in a serving cell. BFD/BFR is performed per TRP. In a serving cell supporting multiple TRPs, separate BFD-RS set (or BFD-RSs) and separate candidate beam list for each TRP is signaled by gNB. BFD-RS set refers to BFD-RSs which the UE measures for beam failure detection. A beam failure is detected for a TRP (i.e., BFD-RS set) of a serving cell if number of consecutive detected beam failure instances for the TRP (i.e., BFD-RS set) exceeds a configured maximum number (beamFailureInstanceMaxCount) within a configured time (beamFailureDetectionTimer). beamFailureDetectionTimer and beamFailureInstanceMaxCount is configured/signaled by gNB separately for each TRP (i.e., BFD-RS set) of serving cell. A Beam Failure Instance for a TRP (i.e., BFD-RS set) means that hypothetical PDCCH BLER determined based on measurement of beam failure detection RS is above a threshold for all beam failure detection RSs of the TRP (i.e., BFD-RS set). Upon beam failure instance for a TRP (i.e., BFD-RS set), lower layer, i.e., PHY sends indication to MAC. MAC entity in UE performs the following operation for each serving cell configured with multiple TRPs, i.e., BFD-RS sets:

The MAC entity shall for each Serving Cell configured for beam failure detection:
1> if the Serving Cell is configured with multiple BFD-RS sets, the MAC entity shall for each BFD-RS set of this Serving Cell:
2> if beam failure instance indication for a BFD-RS set has been received from lower layers:

3> start or restart the beamFailureDetectionTimer corresponding to the BFD-RS set;
3> increment BFI_COUNTER corresponding to the BFD-RS set by 1;
3> if BFI_COUNTER corresponding to the BFD-RS set>=beamFailureInstanceMaxCount:
4> trigger a BFR for this BFD-RS set of the Serving Cell;
2> if BFR for both BFD-RS sets of the Serving Cell are triggered and pending (i.e., not cancelled or not successfully completed):
3> if the Serving Cell is SpCell:
4> initiate a Random Access procedure on the SpCell;
RA procedure is contention based.
If 4 step RA is selected upon initiation of random access procedure:
  If candidate beam RS list of TRP1 ($1^{st}$ BFD RS set, BFD RS set ID 0) and/or candidate beam RS list of TRP2 ($2^{nd}$ BFD RS set, BFD-RS set ID 1) includes SSB(s) and If SS-RSRP of SSB in candidate beam RS list(s) of TRP1/TRP2 is above threshold,
    Select the SSB. If multiple SSBs in candidate beam RS list(s) are above threshold, select any one or one with highest SS-RSRP.
    Select preamble group (group A or group B as specified in TS 38.321)
    Select contention based preamble corresponding to selected preamble group and SSB
    Select RO corresponding to selected SSB
  UE transmits PRACH preamble on PRACH in RO. UE then receives RAR from gNB in RAR response window. RAR includes UL grant for Msg3 transmission
  C-RNTI MAC CE and Enhanced BFR MAC CE is included in Msg3. Beam failure recovery info of TRP other than TRP whose SSB is selected, is included in Enhanced BFR MAC CE. UE transmit Msg3
If 2 step RA is selected upon initiation of random access procedure:
  If candidate beam RS list of TRP1 (BFD RS set 0) and/or candidate beam RS list of TRP2 (BFD RS set 1) includes SSB(s) and If SS-RSRP of SSB in candidate beam RS list(s) of TRP1/TRP2 is above threshold,
    Select the SSB. If multiple SSBs in candidate beam RS list(s) are above threshold, select any one or one with highest SS-RSRP.
    Select preamble group (group A or group B as specified in TS 38.321)
    Select contention based preamble corresponding to selected preamble group and SSB
    Select RO corresponding to selected SSB
    Select PUSCH resource for MsgA MAC PDU transmission.
  C-RNTI MAC CE and Enhanced BFR MAC CE is included in MsgA. Beam failure recovery info of TRP (i.e., BFD-RS set) other than TRP (i.e., BFD-RS set) whose SSB is selected, is included in Enhanced BFR MAC CE.
  UE transmits PRACH preamble on PRACH and MsgA MAC PDU on PUSCH.
Other details of RA procedure are same as described earlier in the background. In this method if SSB is selected from candidate beam RS List, in the subsequent RA attempts UE may continue to use the selected SSB or select another SSB from the same candidate beam RS list.
4> cancel the pending SR triggered for BFR of a BFD-RS set of SpCell and stop the corresponding sr-ProhibitTimer, if running. (Note that at time instance T1, BFR for one BFD-RS set is triggered and SR may be triggered if UL SCH resources are not available or if UL SCH resources are available but it cannot accommodate neither enhanced BFR MAC CE not truncated enhanced BFR MAC CE. Later at time instance T2, BFR for BFR for another BFD-RS set is triggered while the BFR for first BFD-RS set is still pending. In this case UE will RA procedure and cancel the pending SR).
2> if the Random Access procedure initiated triggered by BFR for both BFD-RS sets of the SpCell is successfully completed:
3> set BFI_COUNTER of each BFD-RS set of SpCell to 0.
3> beam failure recovery procedure is successfully completed.
2> if the beamFailureDetectionTimer of this BFD-RS set expires; or
2> if beamFailureDetectionTimer, beamFailureInstanceMaxCount, or any of the reference signals used for beam failure detection is reconfigured by upper layers associated with this BFD-RS set of the Serving Cell:
3> set BFI_COUNTER corresponding to the BFD-RS set to 0.
2> if a PDCCH addressed to C-RNTI indicating uplink grant for a new transmission is received for the HARQ process used for the transmission of the Enhanced BFR MAC CE or Truncated Enhanced BFR MAC CE which contains beam failure recovery information of this BFD-RS set of the Serving Cell; or
2> if the SCell is deactivated:
3> set BFI_COUNTER corresponding to the BFD-RS set to 0;
1> if the Beam Failure Recovery procedure determines that at least one BFR for BFD-RS set has been triggered and not cancelled for an Scell for which evaluation of the candidate beams has been completed; or
1> if the Beam Failure Recovery procedure determines that at least one BFR for BFD-RS set for only one BFD-RS set has been triggered and not cancelled for an SpCell for which evaluation of the candidate beams has been completed:
2> if UL-SCH resources are available for a new transmission and if the UL-SCH resources can accommodate the Enhanced BFR MAC CE plus its sub header as a result of LCP:
3> instruct the Multiplexing and Assembly procedure to generate the Enhanced BFR MAC CE.
In this case, 2 or 3-byte MAC sub header (depending on LCID/eLCID) is included for enhanced BFR MAC CE in MAC PDU. 2-byte MAC sub header if LCID is used for enhanced BFR MAC CE. 3-byte MAC sub header if eLCID is used for enhanced BFR MAC CE. UE also include 1 or 4 octet Ci/SP bitmap depending on highest serving cell index of S cells for which beam failure is detected for at least one TRP (i.e., BFD-RS set) and candidate beam evaluation is completed. A single octet bitmap is used when the highest ServCellIndex of this MAC entity's SCell for which beam failure is detected and the evaluation of the candidate beams has been completed is less than 8, otherwise four octets are used. Beam failure recovery information of SCell's TRP(s) can be included in the enhanced BFR MAC CE.
2> else if UL-SCH resources are available for a new transmission and if the UL-SCH resources can accommodate the Truncated Enhanced BFR MAC CE plus its sub header as a result of LCP:

3> instruct the Multiplexing and Assembly procedure to generate the Truncated Enhanced BFR MAC CE.

In this case, 2 or 3-byte MAC sub header (depending on LCID/eLCID) is included for Truncated enhanced BFR MAC CE in MAC PDU. 2-byte MAC sub header if LCID is used for Truncated enhanced BFR MAC CE. 3-byte MAC sub header if eLCID is used for Truncated enhanced BFR MAC CE. UE also include 1 or 4 octet Ci/SP bitmap depending on highest serving cell index of SCells for which beam failure is detected for at least one TRP (i.e., BFD-RS set) and candidate beam evaluation is completed. A single octet bitmap is used when the highest ServCellIndex of this MAC entity's SCell for which beam failure is detected and the evaluation of the candidate beams has been completed is less than 8, otherwise four octets are used. Beam failure recovery information of SCell's TRP(s) can be included in the truncated enhanced BFR MAC CE.

2> else:
3> trigger the SR for beam failure recovery of each BFD-RS set for which BFR has been triggered, not cancelled, and for which evaluation of the candidate beams has been completed.

The MAC entity shall for each pending SR not triggered according to the BSR procedure for a Serving Cell:
1> if this SR was triggered by Pre-emptive BSR procedure (see clause 5.4.7) prior to the MAC PDU assembly and a MAC PDU containing the relevant Pre-emptive BSR MAC CE is transmitted; or
1> if this SR was triggered by beam failure recovery (see clause 5.17) of an SCell and a MAC PDU is transmitted and this PDU includes a BFR MAC CE or a Truncated BFR MAC CE which contains beam failure recovery information for this SCell; or
1> if this SR was triggered by beam failure recovery (see clause 5.17) for a BFD-RS set of a Serving Cell and a MAC PDU is transmitted and this PDU includes an Enhanced BFR MAC CE or a Truncated Enhanced BFR MAC CE which contains beam failure recovery information for this BFD-RS set of the Serving Cell; or
1> if this SR was triggered by beam failure recovery (see clause 5.17) of an SCell and this SCell is deactivated (see clause 5.9); or
1> if this SR was triggered by beam failure recovery (see clause 5.17) for a BFD-RS set of an SCell and this SCell is deactivated (see clause 5.9); or
1> if this SR was triggered by consistent LBT failure recovery (see clause 5.21) of an SCell and a MAC PDU is transmitted and the MAC PDU includes an LBT failure MAC CE that indicates consistent LBT failure for this SCell; or
1> if this SR was triggered by consistent LBT failure recovery (see clause 5.21) of an SCell and all the triggered consistent LBT failure(s) for this SCell are cancelled:
2> cancel the pending SR and stop the corresponding sr-ProhibitTimer, if running.

MAC CE Prioritisation

UE is configured with a serving cell X where the serving cell X is configured with multiple BFD-RS sets. UE is also configured with serving cell Y where the serving cell Y is not configured with multiple BFD-RS sets.

Beam failure is detected and beam failure recovery is triggered for the serving cell Y where the legacy (truncated) BFR MAC CE needs to be transmitted for performing beam failure recovery. The BFR MAC CE includes beam failure recovery information of the serving cell, i.e., candidate beam availability indication for beam failure recovery of the serving cell and candidate RS ID of the serving cell if candidate beam is available.

Beam failure is detected and beam failure recovery is triggered for at least one TRP (i.e., BFD-RS set) of the serving cell Y where the (truncated) Enhanced BFR MAC CE needs to be transmitted for performing beam failure recovery of failed TRP(s). The BFR MAC CE includes beam failure recovery information of the failed TRPs (i.e., BFD-RS sets) of the serving cell. Beam failure recovery information of each failed TRP (i.e., BFD-RS set) consists of candidate beam availability indication for beam failure recovery of the TRP of serving cell, BFD-RS set ID and candidate RS ID of the of the failed TRP of serving cell serving cell if candidate beam is available.

The issue is that there may not be sufficient UL grant to include both legacy BFR MAC CE and enhanced BFR MAC CE. So some prioritization rule is needed.

Embodiment 1: In one embodiment of the disclosure it is proposed to prioritize the MAC CE which indicates beam failure detection for SpCell. If SP bit in legacy BFR MAC CE is set to 1, Prioritize legacy BFR MAC CE over enhanced BFR MAC CE. If SP bit in enhanced BFR MAC CE is set to 1, Prioritize enhanced BFR MAC CE over legacy BFR MAC CE. In the above example, where BFR is triggered and is pending for both serving cell X and serving cell Y, if serving cell X is SpCell, enhanced BFR MAC CE is first included in the UL grant. After including the enhanced BFR MAC CE, if there are enough available bits to accommodate legacy (truncated) BFR MAC CE, legacy (truncated) BFR MAC CE is included in the UL grant. After including the enhanced BFR MAC CE, if there are not enough available bits to accommodate legacy (truncated) BFR MAC CE, legacy (truncated) BFR MAC CE is not included in the UL grant.

If SP bit is not set to 1 in either MAC CEs, a) UE can prioritise legacy (truncated) BFR MAC CE OR b) UE can prioritise enhanced (truncated) BFR MAC CE OR c) prioritize legacy or enhanced BFR MAC CE which indicates more number of serving cells having beam failure or d) prioritize legacy or enhanced BFR MAC CE which is indicated by network to prioritise, network (i.e., gNB) can indicate whether to prioritize legacy or enhanced BFR MAC CE using dedicated RRC signalling or system information.

Embodiment 2: In one embodiment of the disclosure it is proposed to prioritize the legacy (truncated) BFR MAC CE. In the above example, where BFR is triggered and is pending for both serving cell X and serving cell Y, legacy (truncated) BFR MAC CE is first included in the UL grant where legacy (truncated) BFR MAC CE includes beam failure recovery information of serving cell Y. After including the legacy (truncated) BFR MAC CE, if there are enough available bits to accommodate (truncated) enhanced BFR MAC CE, (truncated) enhanced BFR MAC CE is included in the UL grant where (truncated) enhanced BFR MAC CE includes beam failure recovery information of TRP(s), i.e., BFD-RS sets of the serving cell X. After including the legacy BFR MAC CE, if there are not enough available bits to accommodate (truncated) enhanced BFR MAC CE, (truncated) enhanced BFR MAC CE is not included in the UL grant.

Embodiment 3: In one embodiment of the disclosure it is proposed to prioritize the (truncated) enhanced BFR MAC CE. In the above example, where BFR is triggered and is pending for both serving cell X and serving cell Y, (truncated) enhanced BFR MAC CE is first included in the UL grant where (truncated) enhanced BFR MAC CE includes beam failure recovery information of TRP(s), i.e., BFD-RS set(s) of the serving cell Y. After including the (truncated) enhanced BFR MAC CE, if there are enough available bits to accommodate legacy (truncated) BFR MAC CE, legacy (truncated) BFR MAC CE is included in the UL grant where legacy (truncated) BFR MAC CE includes beam failure recovery information of serving cell Y. After including the (truncated) enhanced BFR MAC CE, if there are not enough available bits to accommodate legacy (truncated) BFR MAC CE, legacy (truncated) BFR MAC CE is not included in the UL grant.

Embodiment 4: In one embodiment of the disclosure it is proposed to prioritize legacy BFR MAC CE or enhanced BFR MAC CE which indicates more number of serving cells having beam failure.

For example, UE is configured with a serving cell X1 and serving cell X2 where the serving cell X1 and X2 are configured with multiple BFD-RS sets. UE is also configured with serving cell Y1, Y2 and Y3 where the serving cell Y1, Y2 and Y3 are not configured with multiple BFD-RS sets.

Beam failure is detected and beam failure recovery is triggered for the serving cell Y1 and Y2. Beam failure is also detected and beam failure recovery is triggered for a TRP, i.e., BFD-RS set of serving cell X1. In this example legacy BFR MAC CE indicates beam failure detection and beam failure recovery information for two serving cells whereas the enhanced BFR MAC CE indicates beam failure detection and beam failure recovery information of a TRP of one serving cell. So legacy (truncated) BFR MAC CE is first included in the UL grant. After including the legacy (truncated) BFR MAC CE, if there are enough available bits to accommodate (truncated) enhanced BFR MAC CE, (truncated) enhanced BFR MAC CE is included in the UL grant where (truncated). After including the legacy BFR MAC CE, if there are not enough available bits to accommodate (truncated) enhanced BFR MAC CE, (truncated) enhanced BFR MAC CE is not included in the UL grant.

Embodiment 5: In one embodiment of the disclosure it is proposed to prioritize legacy BFR MAC CE or enhanced BFR MAC CE which is indicated by network to prioritise, network (i.e., gNB) can indicate whether to prioritize legacy or enhanced BFR MAC CE using dedicated RRC signalling or system information.

In an example, UE is configured with a serving cell X where the serving cell X is configured with multiple BFD-RS sets. UE is also configured with serving cell Y where the serving cell Y is not configured with multiple BFD-RS sets. In RRC signaling, gNB indicates that legacy BFR MAC CE is prioritised. Beam failure is detected and beam failure recovery is triggered for the serving cell Y where the legacy (truncated) BFR MAC CE needs to be transmitted for performing beam failure recovery. The BFR MAC CE includes beam failure recovery information of the serving cell, i.e., candidate beam availability indication for beam failure recovery of the serving cell and candidate RS ID of the serving cell if candidate beam is available. Since network indicates that legacy BFR MAC CE is prioritised, legacy (truncated) BFR MAC CE is first included in the UL grant. After including the legacy (truncated) BFR MAC CE, if there are enough available bits to accommodate (truncated) enhanced BFR MAC CE, (truncated) enhanced BFR MAC CE is included in the UL grant where (truncated). After including the legacy BFR MAC CE, if there are not enough available bits to accommodate (truncated) enhanced BFR MAC CE, (truncated) enhanced BFR MAC CE is not included in the UL grant.

In the truncated enhanced BFR MAC CE format, if Ci bit is set to 1 for a serving cell index i, beam failure recovery information of serving cell may not be present (i.e., beam failure recovery information of any TRP of serving cell is not present) or partially present (i.e., in case both TRPs are failed, information about only one TRP may be included). Also LCID used in MAC sub header of enhanced BFR MAC CE format and truncated enhanced BFR MAC CE format is also different.

Figure 7:
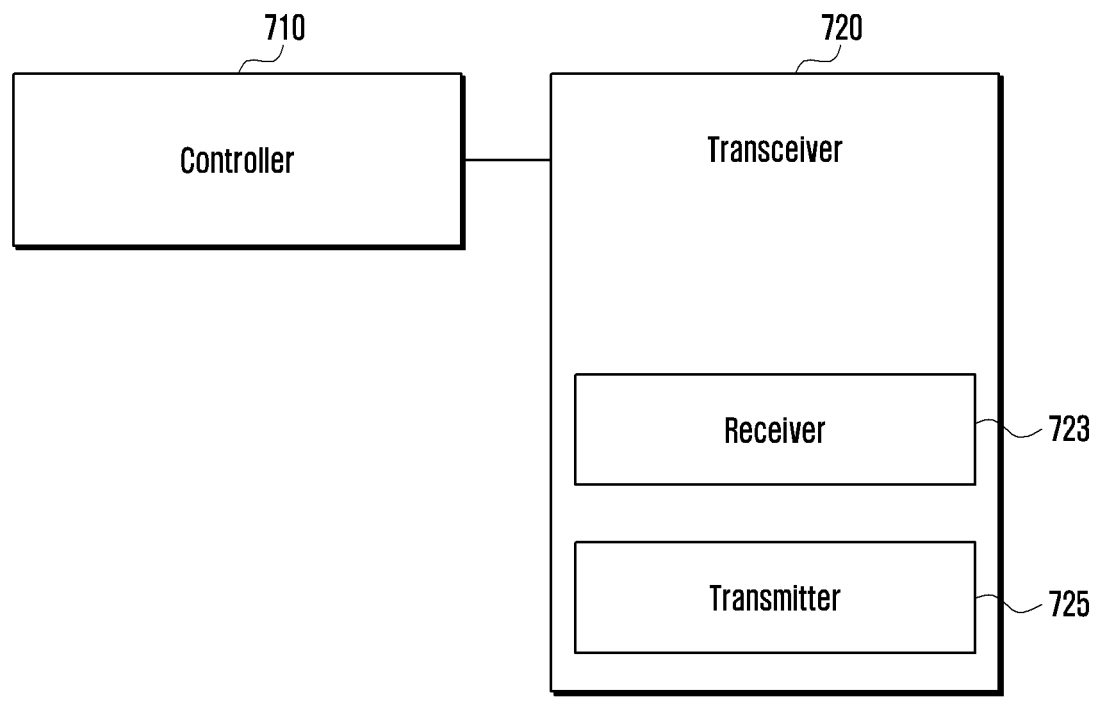
FIG. 7 is a diagram illustrating a configuration of a terminal according to an embodiment of the disclosure.

FIG. 7 is a diagram illustrating a configuration of a terminal according to an embodiment of the disclosure.

The terminal (UE) according to an embodiment of the disclosure may include a transceiver 720 and a controller 710 that controls the overall operation of the terminal. The transceiver 720 may include a transmitter 725 and a receiver 723.

The transceiver 720 may transmit and receive signals to and from other network entities.

The controller 710 may control the terminal to perform one operation in the above-described embodiments. Meanwhile, the controller 710 and the transceiver 720 do not have to be implemented as separated modules but may be implemented as one element such as a single chip. The controller 710 and the transceiver 720 may be electrically connected. For example, the controller 710 may be a circuit, an application-specific circuit, or at least one processor. Further, the operations of the terminal may be performed by including a memory device storing a corresponding program code in a predetermined element within the terminal.

Figure 8:
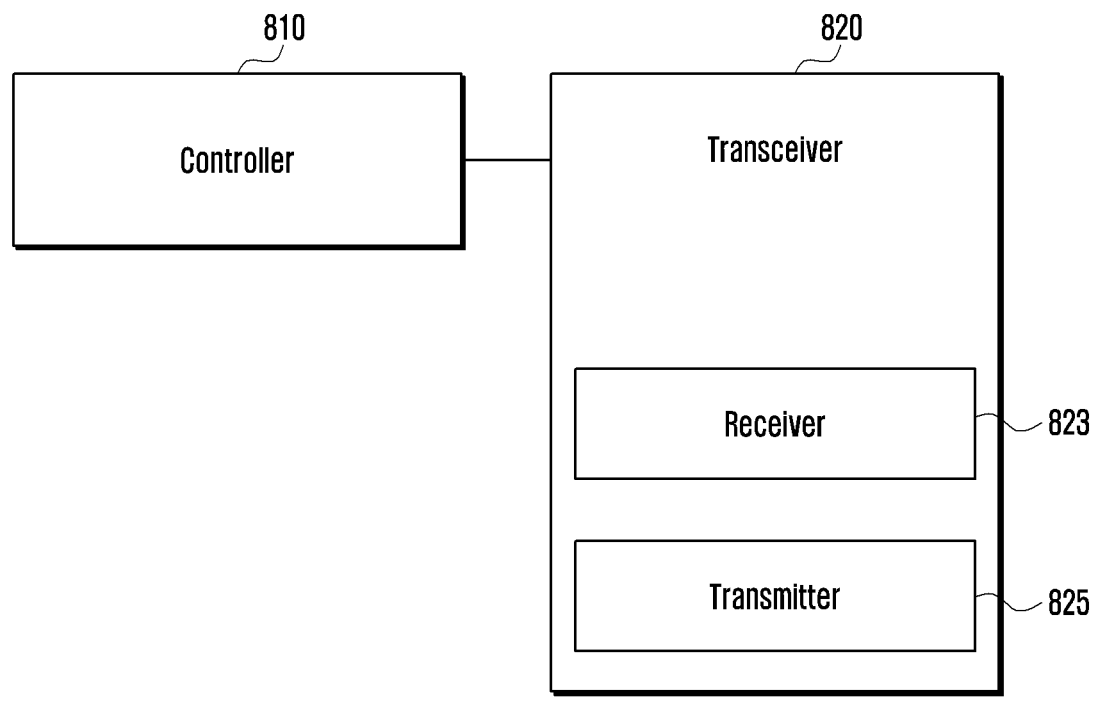
FIG. 8 is a diagram illustrating a configuration of a base station according to an embodiment of the disclosure.

FIG. 8 is a diagram illustrating a configuration of a base station according to an embodiment of the disclosure.

The base station according to an embodiment of the disclosure may include a transceiver 820 and a controller 810 that controls the overall operation of the base station. The transceiver 820 may include a transmitter 825 and a receiver 823.

The transceiver 820 may transmit and receive signals to and from network entities and the terminal.

The controller 810 may control the base station to perform one operation in the above-described embodiments. Meanwhile, the controller 810 and the transceiver 820 do not have be implemented as separated modules but may be implemented as one element such as a single chip. The controller 810 and the transceiver 820 may be electrically connected. For example, the controller 810 may be a circuit, an application-specific circuit, or at least one processor. Further, the operations of the base station may be performed by including a memory device storing a corresponding program code in a predetermined element within the base station.

It should be noted that the block diagrams, example diagrams of a control/data signal transmission method, example diagrams of an operation procedure, and diagrams illustrated in FIGS. 1 to 8 have no intent to limit the scope of the disclosure. That is, it should not be construed that all element parts, entities, or operations shown in FIGS. 1 to 8 are essential elements for implementing the disclosure, and it should be understood that only a few elements may implement the disclosure within the scope without departing the subject matter of the disclosure.

The operations of the base station or the UE may be performed when a predetermined element within the base station or the UE apparatus includes a memory device storing the corresponding program code. That is, the controller of the base station or the UE apparatus may perform the operations by reading and executing the program code stored in the memory device through a processor or a Central Processing Unit (CPU).

Various elements and modules of the entity, the base station, or the UE used in the specification may operate by using a hardware circuit, for example, a combination of a complementary metal oxide semiconductor-based logical circuit, firmware, software and/or hardware, or a combination of firmware and/or software inserted into a machine-readable medium. For example, various electrical structures and methods may be performed using transistors, logic gates, and electrical circuits such as application specific integrated circuit.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   identifying that beam failure recovery is triggered for a first beam failure detection reference signal (BFD-RS) set of a special cell (SpCell) and a second BFD-RS set of the SpCell; and
   in case that the beam failure recovery is triggered for the first BFD-RS set of the SpCell and the second BFD-RS set of the SpCell, performing a random access procedure on the SpCell,
   wherein the performing includes transmitting, to a base station, a message comprising enhanced beam failure recovery (BFR) medium access control (MAC) control element (CE),
   wherein the enhanced BFR MAC CE comprises zero, one, or two beam failure recovery information of the SpCell based on an available grant size for the message, and each beam failure recovery information of SpCell corresponds to one of the first BFD-RS set of the SpCell and the second BFD-RS set of the SpCell, and
   wherein the enhanced BFR MAC CE comprises beam failure recovery information for the SpCell first, then beam failure recovery information for at least one secondary cell (SCell) while not exceeding the available grant size for the message.

2. The method of claim 1,
   wherein in case that the available grant size for the message is available for beam failure recovery information for the first BFD-RS set of the SpCell and beam failure recovery information for the second BFD-RS set of the SpCell, the enhanced BFR MAC CE comprises the beam failure recovery information for the first BFD-RS set of the SpCell and the beam failure recovery information for the second BFD-RS set of the SpCell,
   wherein in case that the available grant size for the message is available for one of the beam failure recovery information for the first BFD-RS set of the SpCell or the beam failure recovery information for the second BFD-RS set of the SpCell, the enhanced BFR MAC CE comprises the one of the beam failure recovery information for the first BFD-RS set of the SpCell or the beam failure recovery information for the second BFD-RS set of the SpCell, and
   wherein in case that the available grant size for the message is available for neither the beam failure recovery information for the first BFD-RS set of the SpCell nor the beam failure recovery information for the second BFD-RS set of the SpCell, a number of beam failure recovery information of SpCell in the enhanced BFR MAC CE is zero.

3. The method of claim 1, wherein the message further comprises cell-radio network temporary identifier (C-RNTI) MAC CE.

4. The method of claim 1, wherein the message is a message A (MsgA) or a message 3 (Msg3).

5. The method of claim 1, wherein the enhanced BFR MAC CE further comprises at least one of identity of the first BFD-RS set, identity of the second BFD-RS set, candidate reference signal (RS) identity (ID) for the first BFD-RS set, or candidate RS ID for the second BFD-RS set, in case that the enhanced BFR MAC CE comprises one or two beam failure recovery information for at least one of the first BFD-RS set of the SpCell or the second BFD-RS set of the SpCell.

6. A method performed by a base station in a wireless communication system, the method comprising:
   receiving, from a terminal on a special cell (SpCell), a message comprising enhanced beam failure recovery (BFR) medium access control (MAC) control element (CE) based on a random access procedure; and
   determining that a beam failure is detected for a first beam failure detection reference signal (BFD-RS) set of the SpCell and a second BFD-RS set of the SpCell based on the enhanced BFR MAC CE,
   wherein the enhanced BFR MAC CE comprises zero, one, or two beam failure recovery information of the SpCell based on an available grant size for the message, and each beam failure recovery information of SpCell corresponds to one of the first BFD-RS set of the SpCell and the second BFD-RS set of the SpCell, and
   wherein the enhanced BFR MAC CE comprises beam failure recovery information for the SpCell first, then beam failure recovery information for at least one secondary cell (SCell) while not exceeding the available grant size for the message.

7. The method of claim 6,
   wherein the available grant size for the message is available for beam failure recovery information for the first BFD-RS set of the SpCell and beam failure recovery information for the second BFD-RS set of the SpCell, the enhanced BFR MAC CE comprises the beam failure recovery information for the first BFD-RS set of the SpCell and the beam failure recovery information for the second BFD-RS set of the SpCell,
   wherein in case that the available grant size for the message is available for one of the beam failure recovery information for the first BFD-RS set of the SpCell or the beam failure recovery information for the second BFD-RS set of the SpCell, the enhanced BFR MAC CE comprises the one of the beam failure recovery information for the first BFD-RS set of the SpCell or the beam failure recovery information for the second BFD-RS set of the SpCell, and
   wherein in case that the available grant size for the message is available for neither the beam failure recovery information for the first BFD-RS set of the SpCell nor the beam failure recovery information for the second BFD-RS set of the SpCell, a number of beam failure recovery information of SpCell in the enhanced BFR MAC CE is zero.

8. The method of claim 6,
wherein the message further comprises cell-radio network temporary identifier (C-RNTI) MAC CE, and
wherein the message is a message A (MsgA) or a message 3 (Msg3).

9. The method of claim 6, wherein the enhanced BFR MAC CE further comprises at least one of identity of the first BFD-RS set, identity of the second BFD-RS set, candidate reference signal (RS) identity (ID) for the first BFD-RS set, or candidate RS ID for the second BFD-RS set, in case that the enhanced BFR MAC CE comprises one or two beam failure recovery information for at least one of the first BFD-RS set of the SpCell or the second BFD-RS set of the SpCell.

10. A terminal in a wireless communication system, the terminal comprising:
a transceiver; and
a controller configured to:
identify that a beam failure recovery is triggered for a first beam failure detection reference signal (BFD-RS) set of a special cell (SpCell) and a second BFD-RS set of the SpCell, and
in case that the beam failure recovery is triggered for the first BFD-RS set of the SpCell and the second BFD-RS set of the SpCell, perform a random access procedure on the SpCell,
wherein the controller is configured to transmit, to a base station via the transceiver, a message comprising enhanced beam failure recovery (BFR) medium access control (MAC) control element (CE),
wherein the enhanced BFR MAC CE comprises zero, one, or two beam failure recovery information of the SpCell based on an available grant size for the message, and each beam failure recovery information of SpCell corresponds to one of the first BFD-RS set of the SpCell and the second BFD-RS set of the SpCell, and
wherein the enhanced BFR MAC CE comprises beam failure recovery information for the SpCell first, then beam failure recovery information for at least one secondary cell (SCell) while not exceeding the available grant size for the message.

11. The terminal of claim 10,
wherein the available grant size for the message is available for beam failure recovery information for the first BFD-RS set of the SpCell and beam failure recovery information for the second BFD-RS set of the SpCell, the enhanced BFR MAC CE comprises the beam failure recovery information for the first BFD-RS set of the SpCell and the beam failure recovery information for the second BFD-RS set of the SpCell,
wherein in case that the available grant size for the message is available for one of the beam failure recovery information for the first BFD-RS set of the SpCell or the beam failure recovery information for the second BFD-RS set of the SpCell, the enhanced BFR MAC CE comprises the one of the beam failure recovery information for the first BFD-RS set of the SpCell or the beam failure recovery information for the second BFD-RS set of the SpCell, and
wherein in case that the available grant size for the message is available for neither the beam failure recovery information for the first BFD-RS set of the SpCell nor the beam failure recovery information for the second BFD-RS set of the SpCell, a number of beam failure recovery information of SpCell in the enhanced BFR MAC CE is zero.

12. The terminal of claim 10, wherein the message further comprises cell-radio network temporary identifier (C-RNTI) MAC CE.

13. The terminal of claim 10, wherein the message is a message A (MsgA) or a message 3 (Msg3).

14. The terminal of claim 10, wherein the enhanced BFR MAC CE further comprises at least one of identity of the first BFD-RS set, identity of the second BFD-RS set, candidate reference signal (RS) identity (ID) for the first BFD-RS set, or candidate RS ID for the second BFD-RS set, in case that the enhanced BFR MAC CE comprises one or two beam failure recovery information for at least one of the first BFD-RS set of the SpCell or the second BFD-RS set of the SpCell.

15. A base station in a wireless communication system, the base station comprising:
a transceiver; and
a controller coupled with the transceiver and configured to:
receive, from a terminal on a special cell (SpCell) via the transceiver, a message comprising enhanced beam failure recovery (BFR) medium access control (MAC) control element (CE) based on a random access procedure, and
determine that a beam failure is detected for a first beam failure detection reference signal (BFD-RS) set of the SpCell and a second BFD-RS set of the SpCell based on the enhanced BFR MAC CE,
wherein the enhanced BFR MAC CE comprises zero, one, or two beam failure recovery information of the SpCell based on an available grant size for the message, and each beam failure recovery information of SpCell corresponds to one of the first BFD-RS set of the SpCell and the second BFD-RS set of the SpCell, and
wherein the enhanced BFR MAC CE comprises beam failure recovery information for the SpCell first, then beam failure recovery information for at least one secondary cell (SCell) while not exceeding the available grant size for the message.

16. The base station of claim 15,
wherein the available grant size for the message is available for beam failure recovery information for the first BFD-RS set of the SpCell and beam failure recovery information for the second BFD-RS set of the SpCell, the enhanced BFR MAC CE comprises the beam failure recovery information for the first BFD-RS set of the SpCell and the beam failure recovery information for the second BFD-RS set of the SpCell,
wherein in case that the available grant size for the message is available for one of the beam failure recovery information for the first BFD-RS set of the SpCell or the beam failure recovery information for the second BFD-RS set of the SpCell, the enhanced BFR MAC CE comprises the one of the beam failure recovery information for the first BFD-RS set of the SpCell or the beam failure recovery information for the second BFD-RS set of the SpCell, and
wherein in case that the available grant size for the message is available for neither the beam failure recovery information for the first BFD-RS set of the SpCell nor the beam failure recovery information for the second BFD-RS set of the SpCell, a number of beam failure recovery information of SpCell in the enhanced BFR MAC CE is zero.

17. The base station of claim 15,
wherein the message further comprises cell-radio network temporary identifier (C-RNTI) MAC CE, and
wherein the message is a message A (MsgA) or a message 3 (Msg3).

18. The base station of claim 15, wherein the enhanced BFR MAC CE further comprises at least one of identity of the first BFD-RS set, identity of the second BFD-RS set, candidate reference signal (RS) identity (ID) for the first BFD-RS set, or candidate RS ID for the second BFD-RS set, in case that the enhanced BFR MAC CE comprises one or two beam failure recovery information for at least one of the first BFD-RS set of the SpCell or the second BFD-RS set of the SpCell.

* * * * *